US009286370B2

(12) United States Patent
Cushing et al.

(10) Patent No.: US 9,286,370 B2
(45) Date of Patent: Mar. 15, 2016

(54) VIEWING A DIMENSIONAL CUBE AS A VIRTUAL DATA SOURCE

(75) Inventors: David B. Cushing, Osgoode (CA); Martin Petitclerc, Quebec (CA)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 12/711,562

(22) Filed: Feb. 24, 2010

(65) Prior Publication Data
US 2011/0208690 A1    Aug. 25, 2011

(51) Int. Cl.
*G06F 17/30* (2006.01)

(52) U.S. Cl.
CPC .............................. *G06F 17/30592* (2013.01)

(58) Field of Classification Search
CPC ............... G06F 17/30592; G06F 17/30563; G06F 17/30424; G06F 17/30442; G06F 17/30554; G06F 17/30595; G06F 17/30289
USPC .................................................. 707/760, 763
See application file for complete search history.

(56) References Cited

U.S. PATENT DOCUMENTS

| | | | |
|---|---|---|---|
| 6,477,536 B1 | 11/2002 | Pasumansky et al. | |
| 7,010,523 B2 | 3/2006 | Greenfield et al. | |
| 7,028,046 B2 | 4/2006 | Anjur et al. | |
| 7,167,864 B1 | 1/2007 | Vasudevan | |
| 7,222,130 B1 | 5/2007 | Cras et al. | |
| 2002/0087516 A1* | 7/2002 | Cras et al. ........................ | 707/2 |
| 2004/0039736 A1* | 2/2004 | Kilmer et al. ..................... | 707/3 |
| 2005/0010565 A1* | 1/2005 | Cushing et al. .................. | 707/3 |
| 2005/0246357 A1 | 11/2005 | Geary et al. | |
| 2007/0061291 A1 | 3/2007 | Azizi | |
| 2007/0208721 A1* | 9/2007 | Zaman et al. .................... | 707/4 |
| 2008/0016043 A1 | 1/2008 | Bakalash et al. | |
| 2008/0021864 A1 | 1/2008 | Bakalash et al. | |
| 2008/0313184 A1* | 12/2008 | Li et al. .............................. | 707/7 |
| 2010/0017395 A1* | 1/2010 | Wayn et al. ....................... | 707/5 |

FOREIGN PATENT DOCUMENTS

WO    2005106711 A1    11/2005

OTHER PUBLICATIONS

Niemi, Tapio, Jyrki Nummenmaa, and Peter Thanisch. "Constructing OLAP cubes based on queries." Proceedings of the 4th ACM international workshop on Data warehousing and OLAP. ACM, 2001.*
Colossi, Nathan, William Malloy, and Berthold Reinwald. "Relational extensions for OLAP." IBM Systems Journal 41.4 (2002): 714-731.*
Agrawal, Rakesh, Ashish Gupta, and Sunita Sarawagi. "Modeling multidimensional databases." Data Engineering, 1997. Proceedings. 13th International Conference on. IEEE, 1997.*

(Continued)

*Primary Examiner* — Hosain Alam
*Assistant Examiner* — Nan Hutton
(74) *Attorney, Agent, or Firm* — Patterson & Sheridan, LLP

(57) ABSTRACT

Techniques are disclosed for generating a dimensional query that includes dimensional and relational constructs. A report specification for retrieving data from a dimensional data model is received. The report specification includes the dimensional and relational constructs. The dimensional query is generated from the report specification, based on a predetermined sequence of applying the dimensional and relational constructs.

24 Claims, 32 Drawing Sheets

(56) References Cited

OTHER PUBLICATIONS

Ammoura-et al., "Towards a Novel OLAP Interface for Distributed Data Warehouses," INSPEC/Springer-Verlag, pp. 174-185; 2001.

Kurz-et al., "Data Warehousing Within Intranet: Prototype of a Web-Based Executive Information System," INSPEC/IEEE; pp. 627-632, 1997.

Kotidis-et al., "A Case for Dynamic View Management," ACM Digital Library, vol. 26: No. 4, pp. 388-423, Dec. 2001.

Bebel-et al., "Creation and Management of Versions in Multiversion Data Warehouse," ACM Digital Library, pp. 717-727, Mar. 2004.

Oracle Business Intelligence Reporting and Analysis, an Oracle White Paper (2004) pp. 1-9. Retrieved from http://www.oracle.com/technology/products/bi/pdf/BI_Reporting_Analysis.pdf.

* cited by examiner

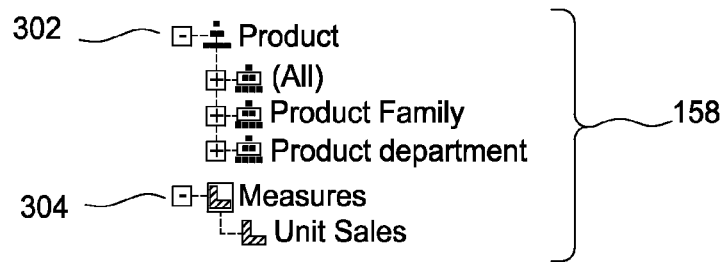

FIG. 3

| Product Family | Product Department | Unit Sales |
|---|---|---|
| Drink | Alcoholic Beverages | 6,838 |
| Drink | Beverages | 13,573 |
| Drink | Dairy | 4,186 |
| Food | Baked Goods | 7,870 |
| Food | Baking Goods | 20,245 |
| Food | Breakfast Foods | 3,317 |
| Food | Canned Foods | 19,026 |
| Food | Canned Products | 1,812 |
| Food | Dairy | 12,885 |
| Food | Deli | 12,037 |
| Food | Eggs | 4,132 |
| Food | Frozen Foods | 26,655 |
| Food | Meat | 1,714 |
| Food | Produce | 37,792 |
| Food | Seafood | 1,764 |
| Food | Snack Foods | 30,545 |
| Food | Snacks | 6,884 |
| Food | Starchy Foods | 5,262 |
| Non-Consumable | Carousel | 841 |
| Non-Consumable | Checkout | 1,779 |
| Non-Consumable | Health and Hygiene | 16,284 |
| Non-Consumable | Household | 27,038 |
| Non-Consumable | Periodicals | 4,294 |

| | Unit Sales |
|---|---|
| Produce | 37,792 |
| Snack Foods | 30,545 |
| Household | 27,038 |

| Top 3 Prod. Dept. | Unit Sales |
|---|---|
| Produce | 37,792 |
| Snack Foods | 30,545 |
| Household | 27,038 |

| | Unit Sales |
|---|---|
| Produce | 37,792 |
| Snack Foods | 30,545 |
| Frozen Foods | 26,655 |

| Dimension | Hierarchy | Level |
|---|---|---|
| Products | Product | Product Family |
| | | Product Department |
| | | Product Category |
| | | Product Subcategory |
| | | Brand Name |
| | | Product Name |
| Time | Time | Year |
| | | Quarter |
| | | Month |

906 — Dimension
908 — Hierarchy
910 — Level

| Measures |
|---|
| Unit Sales |

| Product Family | Product Department | Unit Sales |
|---|---|---|
| <⊟Product Family> | <⊟Product Department> | <Unit Sales> |
| | <Product Department> | <Unit Sales> |
| <Product Family> | <Product Department> | <Unit Sales> |
| | <Product Department> | <Unit Sales> |

FIG. 10A

| Product Family | Product Department | Unit Sales |
|---|---|---|
| Drink | Alcoholic Beverages | 6,838 |
| | Beverages | 13,573 |
| | Dairy | 4,186 |
| Food | Baked Goods | 7,870 |
| | Baking Goods | 20,245 |
| | Breakfast Foods | 3,317 |
| | Canned Foods | 19,026 |
| | Canned Products | 1,812 |
| | Dairy | 12,885 |
| | Deli | 12,037 |
| | Eggs | 4,132 |
| | Frozen Foods | 26,655 |
| | Meat | 1,714 |
| | Produce | 37,792 |
| | Seafood | 1,764 |
| | Snack Foods | 30,545 |
| | Snacks | 6,884 |
| | Starchy Foods | 5,262 |
| Non-Consumable | Carousel | 841 |
| | Checkout | 1,779 |

FIG. 10B

```
SELECT Product Family, Product department, sum (unit Sales) ⎯⎯⎯ 1020
FROM Sales
GROUP BY Product Family, Product Department
ORDER BY Product Family, Product Department ⎯⎯⎯ 1022
```

FIG. 10C

```
                                            1030
SELECT
    CROSSJOIN (
        GENERATE (
    1032 ⎯{ ORDER (
                { [Product] . [Product Family] .MEMBERS },
        1032 ⎯{ [Product] . CURRENTMEMBER . PROPERTIES("CAPTION") ,
                BASC ) ,
            UNION (
                { [Product] . CURRENTMEMBER } ,
        1032 ⎯{ ORDER (
                    DESCENDANTS (
                        [Product] . CURRENTMEMBER ,
                        [Product] . [Product Department] ) ,
            1032 ⎯{ [Product] . CURRENTMEMBER. PROPERTIES ("CAPTION") ,
                    BASC ) ,
                ALL ) ) ,
            ALL ) ,
        { [Measures] . [Unit Sales] } ) ,
    ON AXIS ( 0 )
FROM
    [Sales]
```

FIG. 10D

|  Product Family  | Year | Unit Sales |
|---|---|---|
| <❑Product Family> | <❑Year> | <Unit Sales> |
|  | <Year> | <Unit Sales> |
| <Product Family> | <Year> | <Unit Sales> |
|  | <Year> | <Unit Sales> |

|  Product Family  | Year | Unit Sales |
|---|---|---|
| Drink | 1997 | 24,597 |
| Food | 1997 | 191,940 |
| Non-Consumable | 1997 | 50,236 |

```
SELECT product Family, Year, Sum ( Unit Sales )
FROM Sales
WHERE Unit Sales is not null
```

```
SELECT
    NON EMPTY
    CROSSJOIN(
        [Product] . [Product Family] . MEMBERS,
        CROSSJOIN (
            [Time] . [Year] . MEMBERS,
            { [Measures] . [Unit Sales] } ) )
    ON AXIS ( 0 )
FROM
    [Sales]
```

|  | 1204 | 1206 | 1208 | 1202 |
|---|---|---|---|---|
| | Product Family | Year | Unit Sales | |
| | <[]Product Family> | <[]Year> | <Unit Sales> | |
| | | <Year> | Sales> | |
| | <Product Family> | <Year> | <Unit Sales> | |
| | | <Year> | <Unit Sales> | 1209 |
| | Summary | | <Total(Unit Sales)> | |

FIG. 12A

|  | 1212 | 1214 | 1216 |  |
|---|---|---|---|---|
| | Product Family | Year | Unit Sales | 1210 |
| | Drink | 1997 | 24,597 | |
| | Food | 1997 | 191,940 | |
| | Non-Consumable | 1997 | 50,236 | 1211 |
| | Summary | | 266,773 | |

```
       SELECT Product Family, Year, Sum ( Unit Sales )
       FROM Sales
1222 — WHERE Unit Sales is not null
       GROUP BY Product Family, Year
       UNION
       SELECT 'Summary' as label, ' ' as empty, SUM ( Unit Sales )
       FROM Sales
1222 — WHERE Unit Sales is not null
       GROUP BY label, empty
```

FIG. 12C

```
WITH
    MEMBER
        [Product].[XQE_RS_CMO] AS '
            SUM(
       1232⎯⎯{GENERATE(
                    [Product].[Product Family].MEMBERS,
                    CROSSJOIN(
       1232⎯⎯⎯{ { [Product].CURRENTMEMBER },
                         FILTER(
                             [Time].[Year].MEMBERS,
       1232⎯⎯⎯{    NOT
                                 ( ISEMPTY(
                                     ([Measures].[Unit Sales] ) ) ) ),
                    ALL ),
                ([Measures].[Unit Sales] ) )',
        SOLVE_ORDER = 4
```

1230

```
SELECT
1232 ⌒{ GENERATE (
         [Product].[Product Family].MEMBERS,
         CROSSJOIN (
            { [Product].CURRENTMEMBER },
            CROSSJOIN (
      1232 ⌒{ FILTER (
                  [Time].[Year].MEMBERS,
                  NOT
      1232 ⌒{      ( ISEMPTY (
                          ([Measures].[Unit Sales] ) ) ) ,
               { [Measures].[Unit Sales] } ) ) ,
         ALL ) AS
         [XQE_SA0],
         HEAD (
            { ( [Product].[XQE_RS_CM0],
                [Time].DEFAULTMEMBER,
                [Measures].DEFAULTMEMBER ) },
            COUNT (
               HEAD (
                  [XQE_SA0] ) ,
               IncludeEmpty ) ) }
      ON AXIS ( 0 )
FROM  [Sales]
```

|  Product Family | Product Department | Unit Sales |
|---|---|---|
| <❑Product Family> | <❑Product Department> | <Unit Sales> |
|  | <Product Department> | <Unit Sales> |
| <Product Family> | <Product Department> | <Unit Sales> |
|  | <Product Department> | <Unit Sales> |

FIG. 13A

| Product Family | Product Department | Unit Sales |
|---|---|---|
| Drink | Beverages | 13,573 |
| Food | Baking Goods | 20,245 |
|  | Canned Foods | 19,026 |
|  | Dairy | 12,885 |
|  | Deli | 12,037 |
|  | Frozen Foods | 26,655 |
|  | Produce | 37,792 |
|  | Snack Foods | 30,545 |
| Non-Consumable | Health and Hygiene | 16,284 |
|  | Household | 27,038 |

FIG. 13B

SELECT Product Family, Product Department, SUM ( Unit Sales )
FROM Sales
GROUP BY Product Family, Product Department,
HAVING SUM ( Unit Sales ) > 10,000

FIG. 13C

```
WITH
    MEMBER
        [Measures].[XQE_FT_CM0] AS 'NULL',              ———— 1330
        SOLVE_ORDER = 65535
SELECT
    GENERATE (
        [Product].[Product Family].MEMBERS,
1334 ——{ HEAD ( { ( [Product].CURRENTMEMBER,
                    [Measures].[XQE_FT_CM0] ) },
    1334 ——{ COUNT (
                HEAD (
                    CROSSJOIN (
                        FILTER ( }—— 1332
                            DESCENDANTS (
                                [Product].CURRENTMEMBER,
                                [Product].[Product Department] ),}—— 1332
                            ( [Measures].[Unit Sales] ) > 10000 ),
                            { [Measures].[Unit Sales] } ) AS
                                                          }—— 1332
                            [XQE_SA0] ),
                        IncludeEmpty ) ),
1334 ——{ [XQE_SA0] },
        ALL )
    ON AXIS ( 0 )
FROM
    [Sales]
```

FIG. 13D

| Product Family | Top 3 Prod. Dept. | Unit Sales |
|---|---|---|
| <☐Product Family> | <☐top 3 Prod.Dept.>> | <Unit Sales> |
| | <top 3 Prod.Dept.> | <Unit Sales> |
| <Product Family> | <top 3 Prod.Dept.> | <Unit Sales> |
| | <top 3 Prod.Dept.> | <Unit Sales> |

1404 — Product Family; 1406 — Top 3 Prod. Dept.; 1408 — Unit Sales; 1402

FIG. 14A

| Product Family | Product Department | Unit Sales |
|---|---|---|
| Drink | Beverages | 13,573 |
| | Alcoholic Beverages | 6,838 |
| | Dairy | 4,186 |
| Food | Produce | 37,792 |
| | Snack Foods | 30,545 |
| | Frozen Foods | 26,655 |
| Non-Consumable | Household | 27,038 |
| | Health and Hygiene | 16,284 |
| | Periodicals | 4,294 |

1412 — Product Family; 1414 — Product Department; 1416 — Unit Sales; 1410

FIG. 14B

```
WITH
    MEMBER
        [Measures].[XQE_FT_CM0] AS 'NULL',
        SOLVE_ORDER = 65535
SELECT
    GENERATE (
        [Product].[Product Family].MEMBERS,
        { ( [Product].CURRENTMEMBER,
            [Measures].[XQE_FT_CM0] ),
          CROSSJOIN (
            TOPCOUNT (
                DESCENTSDANTS (
                    [Product].CURRENTMEMBER,
                    [Product].[Product Department] ),
                3,
                ( [Measures].[Unit Sales] ) ),
            { [Measures].[Unit Sales] } ) },
        ALL )
    ON AXIS ( 0 )
FROM [Sales]
```

|  Product Family  | Year | Unit Sales |
|---|---|---|
| <▯Product Family> | <▯Year> | <Unit Sales> |
|  | <Year> | <Unit Sales> |
| <Product Family> | <Year> | <Unit Sales> |
|  | <Year> | <Unit Sales> |
| Summary |  | <Total(Unit Sales)> |

FIG. 15A

| Product Family | Year | Unit Sales |
|---|---|---|
| Drink | 1997 | 24,597 |
|  | 1998 |  |
| Food | 1997 | 191,940 |
|  | 1998 |  |
| Non-Consumable | 1997 | 50,236 |
|  | 1998 |  |
| Summary |  | 266,773 |

FIG. 15B

SELECT Product Family, Year, Sum ( Unit Sales )
FROM Sales
GROUP BY Product Family, Year
UNION
SELECT 'Summary' as label, ' ' as empty, SUM ( Unit Sales )
FROM Sales
GROUP BY label, empty

FIG. 15C

```
WITH
    MEMBER
        [Time].[XQE_RM_CM1] AS '
        SUM (
            [Time].[Year].MEMBERS,
            ([Measures].[Unit Sales]))',
        SOLVE_ORDER = 4
    MEMBER
        ([Product].[XQE_RS_CM0] AS'
        ([Measures].[Unit Sales],
        [Product].[All Products],
        [Time].[XQE_RM_CM1])',
        SOLVE_ORDER = 4
SELECT
    { CROSSJOIN (
        [Product].[Product Family].MEMBERS,
        CROSSJOIN (
            [Time].[Year].MEMBERS,
            {[Measures].[Unit Sales] })),
        (([Product].[XQE_RS_CM0],
        [Time].DEFAULTMEMBER,
        [Measures].DEFAULTMEMBER) }
    ON AXIA (0)
FROM
    [Sales]
```

|  Product Family | Year | Unit Sales |
|---|---|---|
| <▯Product Family> | <▯Year> | <Unit Sales> |
|  | <Year> | <Unit Sales> |
| <Product Family> | <Year> | <Unit Sales> |
|  | <Year> | <Unit Sales> |

1604 — Product Family; 1606 — Year; 1608 — Unit Sales; 1602

FIG. 16A

| Product Family | Year | Unit Sales |
|---|---|---|
| Drink | 1997 | 13,573 |
|  | 1998 |  |
| Food | 1997 |  |
|  | 1998 |  |
| Non-Consumable | 1997 |  |
|  | 1998 |  |

1612 — Product Family; 1614 — Year; 1616 — Unit Sales; 1610

```
SELECT Product Family, Year, Sales
FROM (
        SELECT Product Family, Year, sum ( sales )
        FROM Sales
        WHERE product Family = Drink and product Department = Beverages
        GROUP BY Product Family, Year
        UNION
1622    SELECT  Poduct Family, Year, sum (sales)
        FROM Sales
        WHERE not ( Product Family = Drink and Product Department = Beverages )
        GROUP BY Product Family, Year
)
```

FIG. 16C

```
WITH
    MEMBER
        [Store].[XQE_SL_CM0] AS '
        IIF (
            COUNT (
                INTERSECT (
                    DESCENDANTS (
                        [Product].CURRENTMEMBER,
                        [Product].[Product Department] ),
                    { [Product].[All Products].[Drink].[Beverages] } ) AS
                    [XQE_SA0] ,
                    IncludeEmpty) > 0,
                SUM (
                    [XQE_SA0],
                    ( [Store].DEFAULTMEMBER) ) ,
                NULL )'
SELECT
    CROSSJOIN (
        [Product].[Product family].MEMBERS ,
        CROSSJOIN (
            [Time].[Year].MEMBERS ,
            { [Measures].[Unit Sales] } ) )
    ON AXIS ( 0 )
FROM
    [Sales]
WHERE
    ( [Store].[XQE_SL_CM0]) )
```

| Product Family | Product Department | Unit Sales |
|---|---|---|
| <▯Product Family> | <▯Product Department> | <Unit Sales> |
| | <Product Department> | <Unit Sales> |
| <Product Family> | | <Total(Unit Sales)> |
| <Product Family> | <Product Department> | <Unit Sales> |
| | <Product Department> | <Unit Sales> |
| <Product Family> | | <Total(Unit Sales)> |

FIG. 17A

| Product Family | Product Department | Unit Sales |
|---|---|---|
| Drink | Alcoholic Beverages | 6,838 |
| | Beverages | 13,573 |
| | Dairy | 4,186 |
| Drink | | 24,597 |

FIG. 17C

| Product Family | Product Department | Unit Sales |
|---|---|---|
| Drink | Alcoholic Beverages | 6,838 |
| | Beverages | 13,573 |
| | Dairy | 4,186 |
| Drink | | 24,597 |
| Food | Baked Goods | 7,870 |
| | Baking Goods | 20,245 |
| | Breakfast Foods | 3,317 |
| | Canned Foods | 19,026 |
| | Canned Products | 1,812 |
| | Dairy | 12,885 |
| | Deli | 12,037 |
| | Eggs | 4,132 |
| | Frozen Foods | 26,655 |
| | Meat | 1,714 |
| | Produce | 37,792 |
| | Seafood | 1,764 |
| | Snack Foods | 30,545 |
| | Snacks | 6,884 |
| | Starchy Foods | 5,262 |
| Food | | 191,940 |
| Non-Consumable | Carousel | 841 |
| | Checkout | 1,779 |
| | Health and Hygiene | 16,284 |
| | Household | 27,038 |
| | Periodicals | 4,294 |
| Non-Consumable | | 50,236 |

FIG. 17B

```
SELECT Product Family, Product Department, SUM ( Unit Sales )
FROM Sales
    INNER JOIN (
        SELECT Product Family
        FROM (
            SELECT Product Family, SUM ( Unit Sales )
            FROM Sales
            GROUP BY Product Family
            HAVING SUM ( Unit Sales ) < 25,000
        )
    ) FilteredSales ON Sales . Product Family = FilteredSales . Product Family
GROUP BY Product Family, Product Department
```

```
WITH
    MEMBER
        [Measures].[XQE_FT_CM2]AS 'NULL',
        SOLVE_ORDER = 65535                                     ⎫
    MEMBER                                                      ⎬ 1750
        [Measures].[XQE_RS_CM1] AS '
        ([Measures].[Unit Sales],
            [Product].CURRENT MEMBER)',
        SOLVE_ORDER = 4
SELECT
    GENERATE (
1752 ─── FILTER (
            [Product].[Product Family].MEMBERS,
            ⎧ SUM (
            ⎪     DECENDANTS (
            ⎪         [Product].CURRENTMEMBER,
   1752 ───⎨         [Product].[Product Department] ),
            ⎪         ([Measures].[Unit Sales] ) ) < 25000 ),
            ⎪ { ( [Product].CURRENTMEMBER,
            ⎩     [Measures].[XQE_FT_CM2] ) ,
        CROSSJOIN (
            DECENDANTS (
                [Product].CURRENTMEMBER,
                [Product].[Product Department] ),
            { [Measures].[Unit Sales] } ),
        { [Product].CURRENTMEMBER,
            [Measures].[XQE_RS_CM1] } ,
    ALL )
    ON AXIS ( 0 )
FROM [Sales]
```

FIG. 17E

| | 1804 | 1806 | 1808 | |
|---|---|---|---|---|
| | Product Family | Product Department | Unit Sales | 1802 |
| | <[]Product Family> | <[]Product Department> | <Unit Sales> | |
| | | <Product Department> | <Unit Sales> | |
| | <Product Family> | <Product Department> | <Unit Sales> | |
| 1810 | | <Product Department> | <Unit Sales> | |
| | Summary | | <Total(Unit Sales)> | |

FIG. 18A

| | 1814 | 1816 | 1818 | |
|---|---|---|---|---|
| | Product Family | Product Department | Unit Sales | 1812 |
| | Drink | Alcoholic Beverages | 3,439 | |
| | | Beverages | 6,776 | |
| 1820 | | Dairy | 1,987 | |
| | Summary | | 12,202 | |

FIG. 18B

```
(SELECT) Product Family, Product Department, SUM ( Unit Sales )     ~1848
FROM (
    SELECT Product Family, Product Department, SUM ( Unit Sales )
    FROM Sales
    INNER JOIN (
        SELECT Product Family
        FROM (
            SELECT Product Family, SUM ( Unit Sales )       ~1830
            FROM (
                SELECT Product Family, SUM ( Unit Sales )
                FROM Sales
                WHERE Product Family in ( Drink, Food )     ~1834
                UNION
                SELECT Product Family, null
                FROM Sales
                WHERE Product Family not in (Drink, Food )  ~1834
            )
            WHERE Gender = F              ~1836
            GROUP BY product Family       ~1840
            HAVING SUM ( Unit Sales ) > 15,000
    ) FilteredSales ON Sales . Product Family = FilteredSales . Product
        Family    ~1836                  ~1838
    WHERE (Gender = F) AND (Unit Sales is not null) AND (Product Family in (Drink,  ~1834
    Food)                                                              ~1842
    GROUP BY Product Family, Product Department
    UNION
```

FIG. 18C

```
SELECT Product Family, Product Department, null
FROM Sales
    INNER JOIN (
        SELECT Product Family
        FROM (
            SELECT Product Family, SUM ( Unit Sales )
            FROM (
                SELECT Product Family, SUM ( Unit Sales )
                FROM Sales
                WHERE Product Family in ( Drink, Food )   ~1834
                UNION
                SELECT Product Family, null
                FROM Sales
                WHERE Product Family not in (Drink, Food )   ~1834
            )
            WHERE Gender = F   ~1836
            GROUP BY product Family                         ~1840
            HAVING SUM ( Unit Sales ) > 15,000              ~1838
        )
    ) FilteredSales ON Sales . Product Family = FilteredSales . Product
Family   ~1836
WHERE (Gender = F) AND (Unit Sales is not null) AND (Product Family not in)
( Drink, Food )   ~1834                                             ~1834
GROUP BY Product Family, Product Department
)
ORDER BY Product Family ASC   ~1844
UNION   ~1846

```
...                    ─ 1850
SELECT 'Summary' as label, '' as empty, SUM ( United Sales )
FROM Sales
    INNER JOIN (
        SELECT Product Family
        FROM (
            SELECT Product Family, SUM ( Unit Sales )
            FROM (
                SELECT Product Family, SUM ( Unit Sales )
                FROM Sales
                WHERE Product Family in ( Drink, Food )   ─ 1834
                UNION
                SELECT Product Family, null
                FROM Sales
                WHERE Product Family not in ( Drink, Food )   ─ 1834
            )
            WHERE Gender = F   ─ 1836
            GROUP BY product Family   ─ 1840
            HAVING SUM ( Unit Sales ) > 15,000
        )
    ) FilteredSales ON Sales . Product Family = FilteredSales . Product Family
                                                   ─ 1838              ─ 1834
WHERE Gender = F AND Unit Sales is not null AND Product Family in ( Drink, Food )
─1836     ─1840
GROUP BY label, empty
```

FIG. 18D

```
WITH
    MEMBER
        [Measures].[XQE_FT_CM3] AS 'NULL'
        SOLVE_ORDER = 65535
    MEMBER
        [Product].[XQE_RS_CM2] AS '
        SUM (
            GENERATE (
                FILTER (
                    [Product].[Product Family].MEMBERS,
                    SUM (
                        DESCENDANTS (
                            [Product].CURRENTMEMBER,
                            [Product].[Product Department] ),
                        ( [Measures].[Unit Sales] ,
                            [Gender].[XQE_MDF_CM1] ) ) < 15000 ),
                FILTER (
                    DESCENDANTS (
                        [Product].CURRENTMEMBER ,
                        [Product].[Product department] ) ,
                    NOT
                    ( ISEMPTY (
                        ( [Measures].[Unit Sales] ,
                            [Gender].[XQE_MDF_CM1] ) ) ) ),
                ALL ) ,
            ( [Measures].[Unit Sales] ) )' ,
        SOLVE_ORDER = 4
```

FIG. 18E

```
           ⎧  MEMBER
           ⎪    [Gender].[XQE_MDF_CMI] AS '
1870 ──────⎨    ([Gender].[All Gender].[F],        ── 1868
           ⎪    [Store].[XQE_SL_CM0])'
           ⎩
           ⎧  MEMBER
           ⎪    [Store].[XQE_SL_CM0] AS '
           ⎪    IIF (
           ⎪      COUNT (
           ⎪        INTERSECT (
           ⎪          DESCENDANTS (
           ⎪            [Product].CURRENTMEMBER,
           ⎪            [Product].[Product Department] ),
           ⎪          GENERATE (
           ⎪            {[Product].[All Products].[Drink],
1870 ──────⎨             [Product].[All Products].[Food] },
           ⎪            DESCENDANTS (
           ⎪              [Product].CURRENTMEMBER,
           ⎪              [Product].[Product Department] ),
           ⎪            ALL ) ) AS
           ⎪        [XQE_SA1],
           ⎪        IncludeEmpty ) > 0 ,
           ⎪      AGGREGATE (
           ⎪        [XQE_SA1],
           ⎪        ([Store].DEFAULTMEMBER ) ),
           ⎩      NULL )'
           ...
```

FIG. 18E
(CONTINUED)

```
SELECT
  { GENERATE (
1872─┘  ORDER (
          FILTER (
            [Product].[Product Family].MEMBERS,
            SUM (                                                    ─ 1860
              DESCENDANTS (
                [Product].CURRENTMEMBER,
                [Product].[Product Department] ) ,
              ( [Measures].[Unit Sales] ) ) , 15000 ) ,
       1862 ─┘ [Product].CURRENTMEMBER.PROPERTIES ( "MEMBER_CAPTION" ) ,
            BASIC ) ,
1872 ─┘ { HEAD ( { { [Product].CURRENTMEMBER,
            [Measures].[XQE_FT_CM3] } } ,
          COUNT (
            HEAD (
              CROSSJOIN (
                FILTER (
                  DESCENDANTS (
                    [Product].CURRENTMEMBER,
                    [Product].[Product Department] ) ,
              1864 ─┘ NOT (
                    ( ISEMPTY (
                      ( [Measures].[Unit Sales] ) ) ) ) ,
            { [Measures].[Unit Sales] } ) AS

```
                                    [XQE_SA2] ) ,
                                        IncludeEmpty ) ) ,
                        [XQE_SA2] } ,
                    ALL ) AS
                [XQE_SA0 ] ,
                HEAD (
                    { ( [Product] . [XQE_RS_CM2] ,
                        [Measures] .DEFAULTMEMBER ) } ,
                    COUNT (
                        HEAD (
                            [XQE_SA0] ) ,
                            IncludeEmpty ) ) }
            ON AXIS ( 0 )
        FROM
            [Sales]
        WHERE ( [Gender] . [XQE_MDF_CM1] )
1870
```

VIEWING A DIMENSIONAL CUBE AS A VIRTUAL DATA SOURCE

BACKGROUND

Many companies today store vast amounts of data in online transaction processing (OLTP) systems and other databases. For example, the data may include business data such as sales, product, and financial data. Decision-makers frequently rely on such data in making business decisions.

However, unlike OLTP systems, which typically capture transaction data for a business, online analytical processing (OLAP) systems summarize the transaction data to further inform decision-making. For example, a business analyst may interpret data aggregated across various business dimensions in an OLAP system. The business analyst may browse, in various contexts, data from the OLAP system. For instance, the business analyst may view sales by product by customer by time, defects by manufacturing plant by time, etc.

Generally, OLAP allows multidimensional analysis of data. That is, OLAP provides data in a form of "views" or "dimensions" that are organized to reflect the multidimensional nature of the data. An OLAP system typically includes data models that allow business analysts to interactively explore data across multiple viewpoints at multiple levels of aggregation, also referred to as levels. An increasingly popular conceptual model for OLAP systems is a data cube (or simply, cube). An OLAP system may store a number of cubes. Each cube includes a set of dimensions (e.g., Time, Geography, Product, etc.). A dimension typically comprises many levels, and the levels are typically hierarchical (e.g., Month, Quarter, and Year for the Time dimension; City, Province, and Country for the Geography dimension, etc.).

SUMMARY

One embodiment of the invention includes a method. The method may include configuring one or more computer processors to perform an operation for generating an online analytical processing (OLAP) query from a report specification for a dimensional data model comprising a cube having a plurality of dimensions, each dimension including a hierarchy of members. The operation may generally include receiving the report specification, wherein the report specification includes a plurality of constructs, wherein each of the plurality of constructs specify to perform a distinct operation on data from the cube, wherein at least one construct of the plurality of constructs specifies to perform a relational operation on the data from the cube, wherein the relational operation is selected from at least a post-aggregation detail filter, a summary filter, and a sort, and a summary; determining a mapping from a relational model to the dimensional model; determining an order in which to apply operations specified by the plurality of constructs of the report specification in the OLAP query to preserve semantics of the report specification in the OLAP query; and generating the OLAP query from the report specification according to the determined mapping from a relational model to a dimensional model and the determined order in which to apply the plurality of constructs.

Another embodiment of the invention includes a computer-readable storage medium containing a program, which, when executed on a processor, performs an operation for generating an online analytical processing (OLAP) query from a report specification for a dimensional data model comprising a cube having a plurality of dimensions, each dimension including a hierarchy of members. The operation may generally include receiving the report specification, wherein the report specification includes a plurality of constructs, wherein each of the plurality of constructs specify to perform a distinct operation on data from the cube, wherein at least one construct of the plurality of constructs specifies to perform a relational operation on the data from the cube, wherein the relational operation is selected from at least a post-aggregation detail filter, a summary filter, and a sort, and a summary; determining a mapping from a relational model to the dimensional model; determining an order in which to apply operations specified by the plurality of constructs of the report specification in the OLAP query to preserve semantics of the report specification in the OLAP query; and generating the OLAP query from the report specification according to the determined mapping from a relational model to a dimensional model and the determined order in which to apply the plurality of constructs.

Still another embodiment of the invention includes a system having one or more computer processors and a memory containing a program, which when executed by the one or more computer processors is configured to perform an operation for generating an online analytical processing (OLAP) query from a report specification for a dimensional data model comprising a cube having a plurality of dimensions, each dimension including a hierarchy of members. The operation may generally include receiving the report specification, wherein the report specification includes a plurality of constructs, wherein each of the plurality of constructs specify to perform a distinct operation on data from the cube, wherein at least one construct of the plurality of constructs specifies to perform a relational operation on the data from the cube, wherein the relational operation is selected from at least a post-aggregation detail filter, a summary filter, and a sort, and a summary; determining a mapping from a relational model to the dimensional model; determining an order in which to apply operations specified by the plurality of constructs of the report specification in the OLAP query to preserve semantics of the report specification in the OLAP query; and generating the OLAP query from the report specification according to the determined mapping from a relational model to a dimensional model and the determined order in which to apply the plurality of constructs.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates a visual representation of a cube, according to one embodiment of the invention.

FIG. 4 illustrates data for the cube, according to one embodiment of the invention.

FIG. 5 illustrates a cross tab report that is responsive to the report specification, according to one embodiment of the invention.

FIG. 6 illustrates results retrieved from executing a relational query, according to one embodiment of the invention.

FIG. 7 illustrates a cross tab report that is responsive to a report specification that includes a detail filter, according to one embodiment of the invention.

FIG. 9 illustrates a portion of a dimensional model of an OLAP data source, according to one embodiment of the invention.

FIGS. 10A-10D relate to conveying a SQL ORDER BY clause in an OLAP query, according to one embodiment of the invention.

FIGS. 11A-11D relate to conveying null suppression in an OLAP query, according to one embodiment of the invention.

FIGS. 12A-12D also relate to conveying null suppression in an OLAP query, according to one embodiment of the invention.

FIGS. 13A-13D relate to conveying a post-aggregation filter in an OLAP query, according to one embodiment of the invention.

FIGS. 14A-14C relate to applying OLAP set operations in an OLAP query, according to one embodiment of the invention.

FIGS. 15A-15D relate to conveying a report summary in an OLAP query, according to one embodiment of the invention.

FIGS. 16A-16D relate to conveying a report slicer in an OLAP query, according to one embodiment of the invention.

FIGS. 17A-17E relate to conveying a summary filter in an OLAP query, according to one embodiment of the invention.

FIGS. 18A-18F relate to conveying multiple reporting constructs in an OLAP query, according to one embodiment of the invention.

DETAILED DESCRIPTION OF THE PREFERRED EMBODIMENTS

Figure 1:
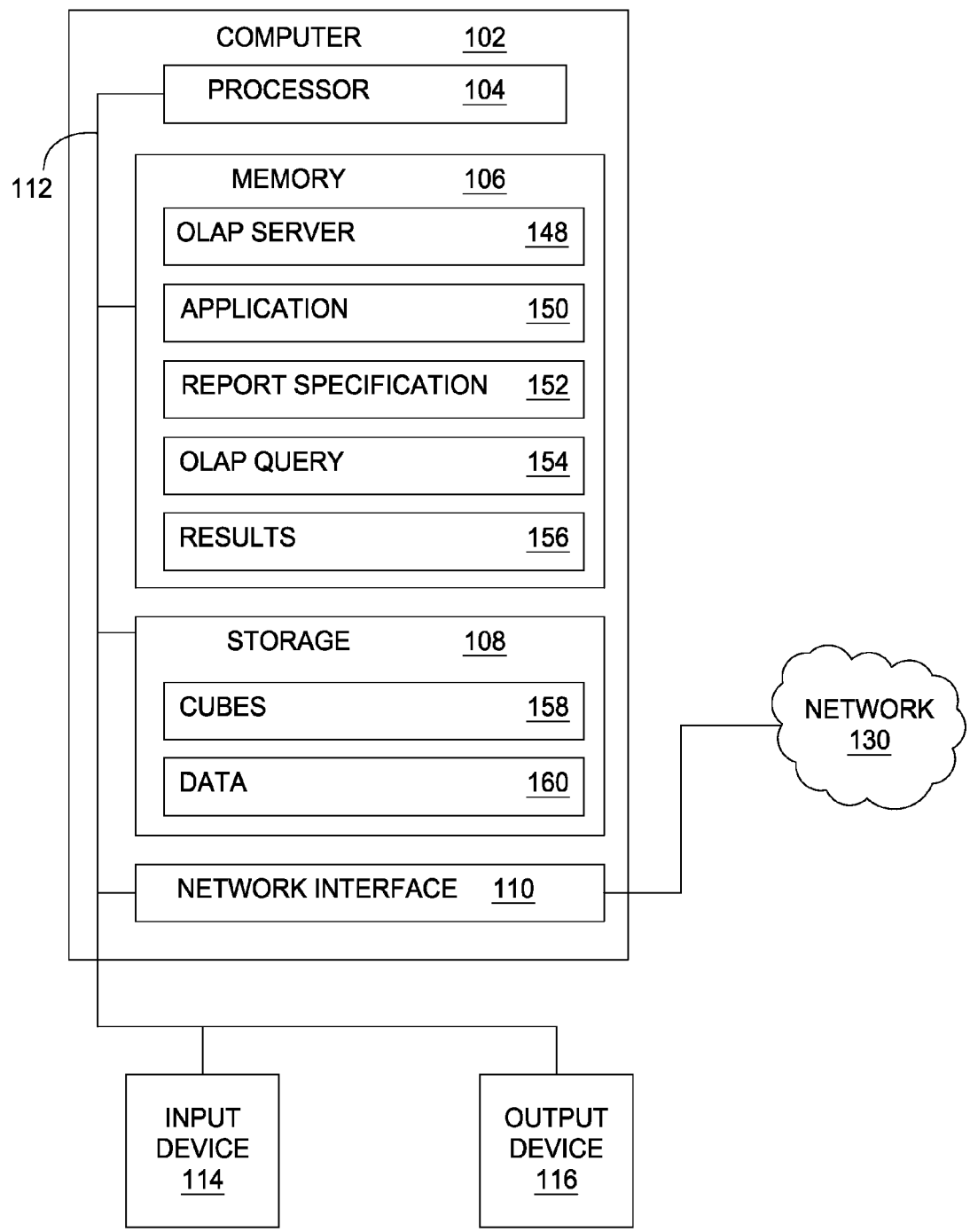
FIG. 1 is a block diagram illustrating a system for generating an OLAP query from a report specification, according to one embodiment of the invention.

Embodiments of the present invention generally provide techniques for viewing an OLAP cube as a virtual data source (e.g., a virtual data warehouse). One embodiment of the invention provides an application that interacts with an OLAP system. For example, the application may generate an OLAP query by processing relational constructs in a report specification in a way that preserves the semantics of the relational constructs (and of the report specification). Thus, results from executing the OLAP query against the OLAP system remain consistent with the results obtained by applying the relational constructs to a relational database directly.

An OLAP system typically aggregates data across various dimensions at various levels to provide different views of the data at different levels of aggregation. The data may be aggregated over various periods of time, by geography, by teams and by product, depending on the type and organization of the business. Aggregated data is commonly referred to as an aggregation. For example, an aggregation may be the sales data for the month of July for a specified product. A slice typically comprises a level from each of the dimensions, and aggregations are typically associated with a slice. A slicer (e.g., an MDX WHERE clause) may explicitly reference a level from at least a subset of the dimensions. The slice that results from the slicer includes the referenced levels and a default member from each of the remaining (unreferenced) dimensions. Typically, the default member is the root (or "all") member that is the rollup/aggregation of all members in a hierarchy of the dimension. For example, if the time dimension is not explicitly referenced in a slicer, then the slice may contain a value relative to all years in the time hierarchy.

Further, each dimension of a cube includes a number of members. The members of a dimension may be organized into a hierarchy by the levels of the dimension. For example, a cube may include a Geography dimension having members representing various geographic locations (e.g., Canada, France, etc.). A member representing Ottawa (existing at the City level of the hierarchy of the geography dimension) may be arranged in the hierarchy as a child member of a member representing Ontario (existing at the Province level of the hierarchy). Similarly, the member representing Ontario may, in turn, be arranged in the hierarchy as a child member of a member representing Canada (existing at the Country level of the hierarchy).

Further, a cube includes measures, i.e., metrics aggregated along dimensional hierarchies of the cube. For example, a cube may include a Total Sales measure for various products over various time periods. Similarly, the cube may also include an Average Sales measure. A user may query an individual cell of the cube by identifying a member in each dimension and a measure.

Typically, business analysts issue OLAP queries to retrieve data and may request aggregations at various levels. If the aggregations are not available, then the OLAP system may compute the aggregations in real-time. Because computing aggregations may be time consuming, various OLAP systems store pre-computed aggregations to process OLAP queries more efficiently.

Examples of operations typically supported by OLAP systems include calculation and modeling applied across dimensions through hierarchies or across members, trend analysis over sequential time periods, slicing subsets for on-screen viewing of the data, drill-down to deeper levels of consolidation of the data, reach-through to underlying detail data, and rotation to new dimensional comparisons in a viewing area associated with the data. An example of an OLAP system is InfoSphere™ Warehouse Cubing Services, available from International Business Machines Corp. (IBM®) of Armonk, N.Y.

In processing an OLAP query, an OLAP server (of an OLAP system) may derive a value of a cell in a cube from data residing outside of the cubes of the OLAP system. For example, the data may reside in an underlying (relational) database. To produce a cell value, an OLAP server may analyze a cell to determine which measure and what members from other dimensions are associated with the cell. Further, if the cell value is not available (i.e., has not been precomputed, or is out of date relative to the underlying data), the OLAP server may generate a relational database query to determine the cell value from the database. The relational database query may aggregate database rows matching dimensional criteria (e.g., rows associated with a time period and product of the cell). An example of a query language for OLAP systems is Multidimensional Expressions (MDX) from Microsoft® Corp. of Redmond, Wash. An example of a query language for relational databases is Structured Query Language (SQL).

For instance, in processing an MDX query against a cube, the OLAP server may generate an SQL query from dimension members and from a measure associated with a cell of the cube. As a result, the relational database aggregates only data relevant to the cell (e.g., based on constraints in a WHERE clause of the SQL statement) and returns the aggregated data to the OLAP server. In general, OLAP queries can fetch data at multiple levels of aggregation, and in one embodiment, one SQL query is generated for each distinct level of aggregated data reference by or contained in the OLAP query.

Further, the OLAP system may interact with other applications to provide users with additional functionality for analyzing and reporting data. Examples of such applications include IBM® Cognos® and SAP® Business Objects™. These applications may provide users with a variety of tools for analyzing data and building reports. For example, these applications may receive a report specification from a user. These applications may convert the report specification into one or more queries to underlying data sources. For example, an application may convert the report specification into one or more SQL and/or OLAP queries.

In some cases, the application may receive a report specification that includes relational constructs. Examples of relational constructs include summary filters and detail filters. However, it may be difficult to apply relational constructs to an OLAP system (rather than a relational database) in a way that produces results consistent with applying the relational constructs to a relational database. For example, OLAP operations may be performed on data from the OLAP system. Results from performing the OLAP operations may be stored in the form of relational tables. Relational operations that correspond to the relational constructs in the report specification may then be performed on the relational tables. However, results from performing this sequence of operations may not always be consistent with applying the relational constructs to a relational database. It may be unacceptable to the user to receive query results that may differ depending on how the data is stored (e.g., relational or OLAP).

To avoid query results that differ depending on how the data is stored, a separate relational database may be created (and maintained) from the OLAP system. Accordingly, OLAP constructs in the report specification may be applied to the OLAP system, while relational constructs in the report specification may be applied to the separate relational database. However, having to create and maintain a separate relational database may be impractical and/or undesirable to the user. Alternatively, the application may limit constructs available to a user to those that are compatible with the data system. For example, if the data system is a relational system, the user may include relational constructs in a report specification for the relational system. The user may also include OLAP constructs in a report specification, to the extent that a relational query language supported by the relational system supports OLAP operators (e.g., CUBE, ROLLUP, and windowed aggregates). On the other hand, if the data system is an OLAP system, the user may include OLAP constructs (but not relational constructs) in a report specification for the OLAP system. However, it may be confusing and/or inconvenient to the user to be able to use certain constructs for one data system but not for another.

In one embodiment, the application may receive a report specification for the OLAP system. The report specification may include relational constructs. The application may generate an OLAP query from the report specification in a way that preserves semantics of the relational constructs (and of the report specification). Thus, results from executing the OLAP query may be consistent with applying the relational constructs to a relational database corresponding to the OLAP system. In other words, the application processes relational constructs in a data-agnostic way (i.e., independent of the way in which the data is stored). Consequently, a user may include relational constructs in a report specification for any system (including an OLAP system).

While embodiments may be described herein with reference to an application that interacts with the OLAP system, other embodiments are broadly contemplated. For example, in one embodiment, the OLAP system itself generates the OLAP query from a report specification using the techniques described herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for generating an OLAP query from a report specification, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

In one embodiment, the memory 106 of the computer 102 includes an OLAP server 148, an application 150, a report specification 152, an OLAP query 154, and results 156 from executing the OLAP query 154. Further, the storage 108 of the computer 102 includes cubes 158 and data 160.

In one embodiment, the OLAP Server may be any software application that summarizes vast amounts of detailed data to provide access to summarized data (in the form of cubes 158). The detailed data, or simply data 160, may be stored in a relational database. The OLAP server 148 may generate the cubes 158 from the data 160 and store the cubes 158 in a dimensional data store. Further, the OLAP server 148 may precompute one or more cells of the cube 158 by querying the relational database. The precomputed cells may be stored in the cube 158. In one embodiment, the cube 158 may be stored as multi-dimensional array structures. In an alternative embodiment, both the data 160 and the cubes 158 may be stored in a relational database.

In one embodiment, the application 150 interacts with the OLAP server 148 to provide users with additional functionality for analyzing and reporting data. For example, the application 150 may create a report for a user based on a report specification 152. In one embodiment, the report specification 152 may be simpler to create than the OLAP query 148. That is, users with less technical knowledge than typically required to compose an OLAP query 148 may nevertheless be able to create a report specification 152. The report specification 152 may be written in a reporting language that hides intricacies of an OLAP query language (e.g., MDX).

In one embodiment, the application 150 converts the report specification 152 into the OLAP query 154 in a way that preserves the semantics of the report specification. For example, the application processes relational constructs in a data-agnostic way (i.e., independent of the way in which the data is stored). Consequently, a user may include relational constructs in a report specification even for an OLAP system.

In one embodiment, the report specification 152 is expressed in a report query language. Unlike relational query languages or OLAP query languages, the report query language is not tied to an OLAP system or to a relational database. The report query language may allow the user to compose queries at a higher (conceptual) level than relational or OLAP query languages. Thus, the report query language may hide intricacies of the OLAP query language (e.g., MDX) from the user.

Typically, relational query languages and relational databases are more suited to reporting relational data than to analyzing dimensional data. A relational query (such as SQL) typically processes data as follows: (i) compute a projection from data; (ii) perform a first level of filtering (e.g., by applying an SQL WHERE clause) on the projected data; (iii) aggregate the filtered data (e.g., by applying SQL GROUP BY clause); and (iv) perform a second level of filtering (e.g., by applying an SQL HAVING clause) on the aggregated data. Further, results from executing a first relational query may act as input to a second relational query.

In contrast, OLAP query languages and OLAP data sources are more suited to analyzing dimensional data than to reporting relational data. An OLAP query defines a section of a multi-dimensional cube by specifying the desired members or tuples of each edge and then retrieving (and/or computing) values from corresponding cells in the cube. In contrast to a relational query such as SQL, an OLAP query (such as MDX) typically processes data as follows: (i) apply a slicer to a cube (e.g., by applying an MDX WHERE clause); (ii) compute members and tuples on each edge of the cube—for example, the multidimensional DBMS applies set operations such as filter, top, bottom, etc., (e.g., MDX edge specification); and (iii) retrieve cell values at intersections of the cube defined by qualified tuples along each edge of the cube. In some cases (e.g., MDX calculated members), the cell values may not be contained in the cube. Instead, the application may compute the cell value based on values within the cube.

In one embodiment, the application converts the report specification 152 into the OLAP query 154 according to a mapping from a relational model to a dimensional model. In the mapping, the dimensional model may maps to/from a snowflake model of a relational data warehouse. Further, a dimensional level within the dimensional model maps to a relational column. Dimensional properties also map to relational columns. Referential integrity is enforced in the dimensional model as in the relational model. Each leaf member of each hierarchy in the dimensional model should exist in at least one row in the fact table in the relational model. Each column (member) in a fact table row should exist once and only once in a corresponding dimension table. Cell coordinates without any value may appear as a row having a null value in the fact table, which may be explicitly suppressed from being included in query results.

In the mapping, a ragged or unbalanced hierarchy maps to columns that may contain null values. As used herein, a hierarchy is "unbalanced" if there is at least one member that: (i) is not at the lowest (i.e. bottommost) level of the hierarchy and (ii) has no children. In other words, the hierarchy is unbalanced if there is at least one leaf member that is not at the lowest level of the hierarchy. Further, a hierarchy is "ragged" if there is at least one parent-child relationship that skips a level. In other words, the hierarchy is ragged if at least one member has a child at a level other than immediately below it. In particular, a column representing the lowest level of an unbalanced hierarchy may contain null values where leaf nodes are not present in the unbalanced hierarchy. Further, a column representing an intermediate level of a ragged hierarchy may contain null values where parent nodes are not present in the ragged hierarchy.

In the mapping, the fact table in the relational model includes a column for each base measure of the dimensional model. Further, parent/child hierarchies map to level-based hierarchies according to distances from the root member. As used herein, a parent/child hierarchy refers to the relationships represented by a reference from each (child) row to its respective parent row. For example, the references may be stored in a "parent" column of a relational table. The application may perform multiple lookups in the relational table (e.g., successively retrieve "parent" rows) to determine a count of levels of the parent/child hierarchy.

In contrast, a level-based hierarchy is defined by relationships between levels of the hierarchy, and each level may map to a different relational column. The application may determine a count of levels of the level-based hierarchy based on the relational columns that represent the levels. Examples of level-based hierarchies may be found in star schemas and snowflake schemas.

The application 150 may be configured to preserve semantics of a report specification by applying constructs of the report specification in a specific order within a single OLAP query. In one embodiment, the application 150 may classify the constructs of the report specification into multiple construct types (e.g., slicer, detail filter, etc.) as well as specify an order to apply constructs (based on the construct types). For example, the order may specify to apply operations with the following precedence (each of which is further described below): slicer, pre-aggregation detail filter, post-aggregation detail filter, dimensional set filtering operators, suppression, summary filter, sort, and summary. Each construct performs a distinct operation on data from the cube. Further, the application 150 may classify the constructs of the report specification as performing relational operations. As used herein, relational operations are designed to report data from a relational data model (rather than to analyze data from a dimensional model). In one embodiment, the relational operation is selected from at least a detail filter (corresponding to a SQL WHERE clause), a summary filter (corresponding to a SQL HAVING clause), a sort (corresponding to a SQL ORDER BY clause), and a summary (corresponding to a SQL GROUP BY clause).

Figure 2:
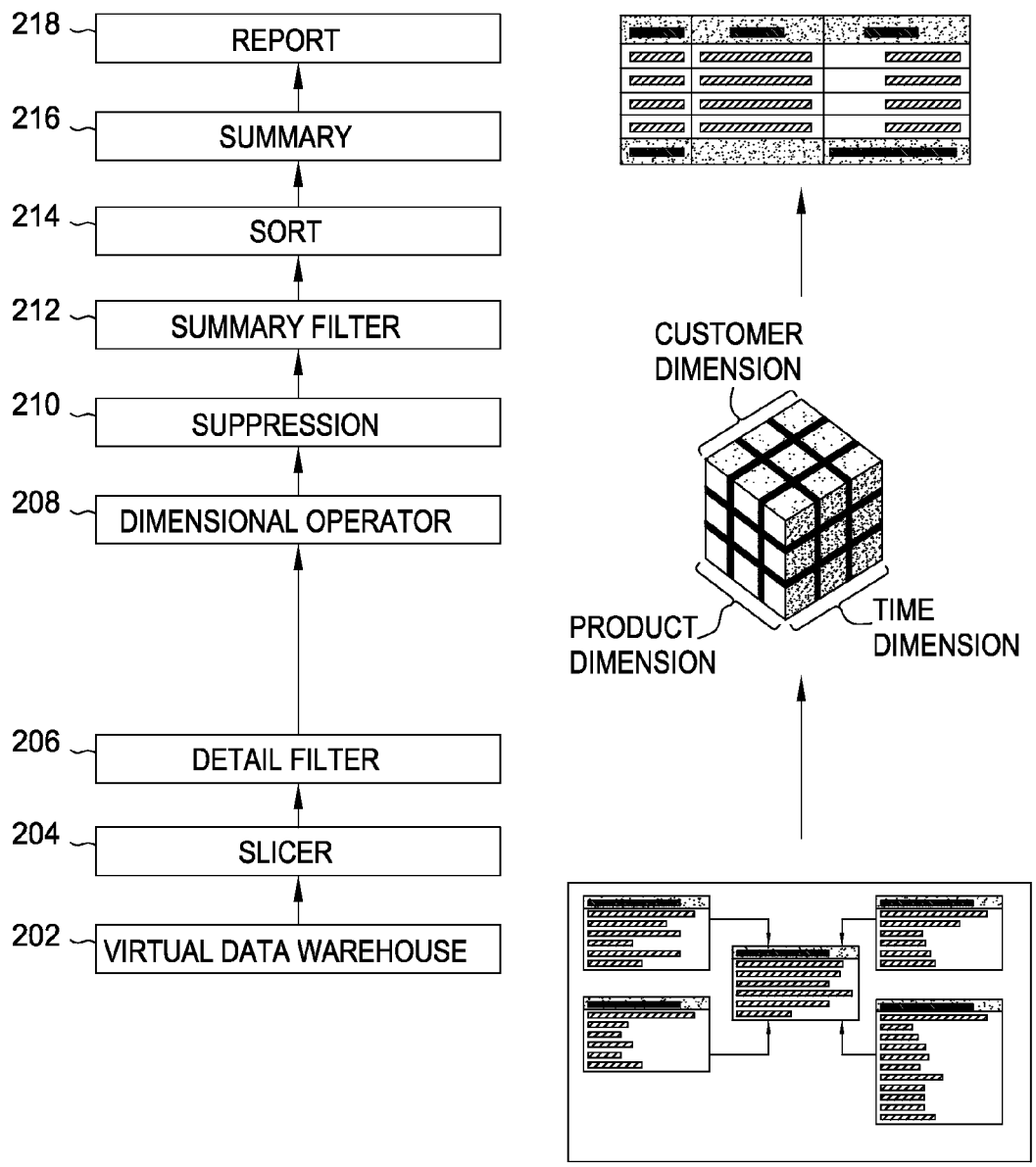
FIG. 2 illustrates a data flow that specifies an order in which to apply constructs of the report specification to preserve semantics of the report specification 152 regardless of how data is stored, according to one embodiment of the invention.

FIG. 2 illustrates a data flow 200 specifying an order to apply constructs from the report specification 152 to preserve semantics of the report specification 152 regardless of the data source, according to one embodiment of the invention. As shown, the data flow 200 includes slicer 204, followed by detail filter 206 (which may include a pre-aggregation detail filter followed by a post-aggregation detail filter), followed by dimensional operator 208, followed by suppression 210, followed by summary filter 212, followed by sort 214, followed by summary 216. By applying constructs of the report specification 152 in the specific order, the application 150 may generate a report 218 that preserves semantics of relational constructs in the report specification 152. Put another way, applying constructs of the report specification 152 in the specific order allows a user to view an OLAP system as a virtual data warehouse 202 (i.e., to which relational constructs may be accurately applied). Each of the construct types is further described as follows.

The first three construct types in the order described above include slicer, detail filter, dimensional operator, and suppression. As used herein, a slicer defines a subset of the overall dimensional space to which other query constructs in the report specification are applied. Further, the slicer may implicitly invoke aggregation of measures relative to dimensions for which the slicer is specified at non-detail levels. The slicer defines a dimensional context in which numeric expressions are computed—except when an expression explicitly references one or more of the dimensions in a slicer, in which case the expression reference overrides the slicer. As such, the application 150 may convey (in an OLAP query) that a slicer is evaluated first (i.e., because the slicer defines the context in which all other operations are performed). Further, the slicer need not be limited to the semantics defined in an OLAP query (e.g., MDX). For example, the OLAP query may not allow a dimension to appear in the slicer if the dimension is projected on the edge of the OLAP query. Nevertheless, the application 150 may generate an OLAP query with the following semantics. The generated OLAP query may compute cells in a context that is based on intersection of members on the slicer with a member on the edge. Further, multiple members from an edge may appear on the slicer.

As described above, a detail filter may correspond to a SQL WHERE clause. The detail filter may be a pre-aggregation or a post-aggregation detail filter. A pre-aggregation detail filter is applied prior to aggregating and/or summarizing data. The filtered data will neither appear in the report nor be used to compute any other values in the report (including aggregations). A user may specify a pre-aggregation detail filter to exclude specific data at the detail level, prior to aggregating or summarizing the data. A post-aggregation detail filter is applied subsequent to aggregating and/or summarizing the data. The post-aggregation detail filter removes rows of detail data after aggregation has been performed. That is, although the rows of detail data are used to compute aggregate values, the rows of detail data are subsequently removed from any remaining steps in constructing a report output. A user may specify a post-aggregation detail filter to exclude data that should only be summarized but not displayed.

Dimensional (set filtering) operators exclude members from the (summarized and/or filtered) data. Dimensional set filtering operators may correspond to MDX set expressions. Once the slicers and detail filters have been performed, the application 150 may: (i) view the data as being dimensional data and (ii) apply OLAP set operations to the data.

The next four construct types in the order described above include suppression 210, summary filter 212, sort 214, and summary 216. As used herein, suppression excludes rows and/or columns containing null (or "0") measure values. Further, suppression may be applied prior to aggregation to prevent null values from affecting specific aggregate functions (e.g., COUNT, AVG, STDDEV, etc.). Suppression removes extraneous data that has no associated data, allowing users to more easily focus on data that is useful to the user. For example, suppression may be applied to "sparse" data sets in which many intersection points of different dimension members/values contain no data (such as data representing that there are no snowmobile sales in July in Texas). A suppression may correspond to an MDX NON EMPTY clause.

Summary filters exclude rows of data at the detail level based on computed summary values. The summary filter removes members/values at a specified grouping (aggregation) level within a report—and any associated sub-groups of members/values. As described above, summary filters may correspond to a SQL HAVING clause.

A sort does not substantively change data, but only changes an order in which the data is presented. The sort may reorder presentation of the data based on values of one or more columns of the data. As described above, a sort may correspond to a SQL ORDER BY clause.

A summary for a group of rows may result from a calculation on projected values within the group of rows. As described above, a summary may correspond to a SQL GROUP BY clause. The summary may be output as headers and/or footers of a list report. In one embodiment, summaries are computed after suppression to ensure that summaries are not suppressed. For example, the report output should include the summary value even if the summary value is null or zero.

In one embodiment, the output from data flow 200 may be fed as input into the data flow 200. That is, a first report specification may be nested inside a second report specification, much like a first SQL query may be nested inside a second SQL query.

FIGS. 3-7 illustrate an example of a particular embodiment of the operations for generating an OLAP query from a report specification using the techniques described above. In particular, a cube having Product and Measures hierarchies is used for generating a report. However, it should be understood that the invention may be adapted to for a broad variety of report specifications, hierarchies, and cubes. Accordingly, references to this particular example are included to be merely illustrative and not limiting.

FIG. 3 illustrates an example of an OLAP cube 158, according to one embodiment of the invention. As shown, the cube 158 includes the Product hierarchy 302 and the Measures hierarchy 304. The Product hierarchy 302 includes the following levels: All, Product Family, and Product Department. The Measures hierarchy 304 includes the following measure: Unit Sales. The measure may include a rollup operation that is configured to sum data. Further, a relational database is available which corresponds to the cube 158. The relational database may include a Product table and a fact table. The Product table may include the following columns: Product Family and Product Department. The Product Department column may be a primary key for the Product table. The fact table may include the following columns: Unit Sales and Product Department (foreign key).

FIG. 4 illustrates the data 160 for the cube 158 (and for a relational database corresponding to the cube 158), according to one embodiment of the invention. As shown, the data 160 includes multiple rows. Each row describes a Product Family 402, a Product Department 404, and a Unit Sales 406. For example, the unit sales for a Drink (specifically, Alcoholic Beverages) is 6,838.

Suppose that the report specification requests for a cross tab report having Unit Sales as a column edge and topcount (Product Department, 3, unit Sales) (i.e., the top 3 product departments based on unit sales) as a row edge. FIG. 5 illustrates a cross tab report 500 that is responsive to the report specification, according to one embodiment of the invention. As shown, the cross tab report 500 includes a column 502 for Unit Sales. Further, the cross tab report 500 includes rows 504 for Produce, Snack Foods, and Household. As shown, unit sales for Produce is 37,792, unit sales for snack foods is 30,545, and unit sales for Household is 27,038.

Table I shows a relational query against a relational database for producing the cross tab report 500 of FIG. 5:

TABLE I

Relational query example

SELECT product.product_department, sum(unit_sales)
FROM product INNERJOIN fact
    ON product.product_department = fact.product_department
GROUP BY product.product_department
ORDER BY 1
LIMIT 0, 3

FIG. 6 illustrates results 600 retrieved from executing the relational query shown in Table I, according to one embodiment of the invention. As shown, the results 600 include a first field representing Top 3 Product Departments and a second field representing Unit Sales. The results 600 correspond to the cross tab report 500. In particular, a pivot operation may be performed on the results 600 to produce the cross tab report 500.

In one embodiment, the application 150 may generate an OLAP query against an OLAP system in a way that preserves the semantics of the report specification. Table II shows an OLAP query for producing the cross tab report 500 of FIG. 5:

TABLE II

OLAP query example

SELECT
    {[Measures].[Unit Sales]} ON AXIS (0),
    TOPCOUNT(   [Product].[Product Department].MEMBERS,
                  3,
                  ([Measures].[Profit]) ) ON AXIS (1)
FROM [Sales]

As is known, TOPCOUNT ( ) is an MDX function that sorts a set in descending order and returns the specified number of elements having the highest values. The application 150 may perform the following sequence of operations to produce the OLAP query shown in Table II. Because the report specification does not specify any subset, the application 150 does not include a slicer in the OLAP query. Because the report specification does not specify any detail filter, the application 150 does not include any detail filter in the OLAP query. The application 150 includes a call to a TOPCOUNT function in the OLAP query. The call to the TOPCOUNT function filters the set of members at the Product Department level. Because the report specification does not include suppression, the application 150 does not include any suppression in the OLAP query. Because the report specification does not apply any summary filter, the application 150 does not include any summary filter in the OLAP query. As for sort, The TOPCOUNT function call includes an implicit sort of the Product Departments. Because the report specification does not include any summary, the application 150 does not include any summary in the OLAP query. Consequently, results from executing the OLAP query shown in Table II are consistent with the cross tab report 500.

Suppose that the report specification additionally includes a detail filter that specifies that the Product Family should be Food (e.g., Product Family in (Food)). FIG. 7 illustrates a cross tab report 700 that is responsive to the report specification, according to one embodiment of the invention. As shown, the cross tab report 700 includes a column 702 for Unit Sales. Further, the cross tab report 700 includes rows 704 for Produce, Snack Foods, and Frozen Foods. As shown, unit sales for Produce is 37,792, unit sales for Snack Foods is 30,545, and unit sales for Frozen Foods is 26,655. That is, the top three Product Departments in the cross tab report 700 differs from those in the cross tab report 500 (as a result of being from the "Food" Product Family).

Table III shows a relational query against the relational database for producing the cross tab report 700 of FIG. 7:

TABLE III

Relational query example (with detail filter)

```
SELECT product.product_department, sum(unit_sales)
FROM product INNERJOIN fact
    ON product.product_department = fact.product_department
WHERE product.product_family = 'Food'
GROUP BY product.product_department
ORDER BY 1
LIMIT 0, 3
```

That is, the relational query includes a new WHERE clause that specifies that the Product Family should be "Food." The relational query of Table III may be executed to retrieve results. A pivot operation may be performed on the results to produce the cross tab report 700 of FIG. 7.

Operations against a relational OLAP (ROLAP) database may also produce the cross tab report 700 of FIG. 7. The operations may include executing a relational query, loading a tabular stream in cache (or constructing a temporary cube), and executing an OLAP query over the intermediate result. The relational query may include the detail filter. Table IV shows such a relational query:

TABLE IV

Relational query for ROLAP (with detail filter)

```
SELECT product.product_department, sum(unit_sales)
FROM product INNERJOIN fact
    ON product.product_department = fact.product_department
WHERE product.product_family = 'Food'
GROUP BY product.product_department
```

Results from executing the relational query of Table IV may be loaded into a tabular stream in cache. An OLAP query, such as shown in Table II, may be executed against the tabular stream to produce the cross tab report 700 of FIG. 7. The OLAP query may include the "Top 3" OLAP construct. However, the "Top 3" OLAP construct is applied to the stream received from the relational database. In other words, an unnecessarily large set of data may be transmitted and processed.

In one embodiment, the application 150 may generate an OLAP query against an OLAP system in a way that preserves the semantics of the report specification, including the detail filter that specifies that the Product Family should be Food. Table V shows an OLAP query for producing the cross tab report 700 of FIG. 7:

TABLE V

OLAP query example (with detail filter)

```
SELECT
    {[Measures].[Unit Sales]} ON AXIS (0),
    TOPCOUNT(  DESCENDANTS(  [Product].[All Products].[Food],
                                [Product].[Product Department]  ),
            3,
            ([Measures].[Profit]) ) ON AXIS (1)
FROM [Sales]
```

As is known, DESCENDANTS ( ) is an MDX function that returns a set of descendants of a member at a specified level or distance. The application 150 may perform the following sequence of operations to produce the OLAP query shown in Table V. Because the report specification does not specify any subset, the application 150 does not include a slicer in the OLAP query. Because the report specification includes a pre-aggregation detail filter, the application 150 includes a call to the DESCENDANTS function (which is applied prior to the TOPCOUNT function) in the OLAP query.

Because the report specification does not include a post-aggregation detail filter, the application 150 does not include any post-aggregation detail filter in the OLAP query. The application 150 includes a call to a TOPCOUNT function in the OLAP query. The call to the TOPCOUNT function filters the set of members at the Product Department level. Because the report specification does not include suppression, the application 150 does not include any suppression in the OLAP query. Because the report specification does not apply any summary filter, the application 150 does not include any summary filter in the OLAP query. As for sort, The TOPCOUNT function call includes an implicit sort of the Product Departments. Because the report specification does not include any summary, the application 150 does not include any summary in the OLAP query. Consequently, results from executing the OLAP query shown in Table V are consistent with the cross tab report 700.

In particular, the application 150 applies constructs in a specific order (such as the order described above). For instance, the application 150 applies the detail filter prior to applying the "top count" set operation. For the detail filter, the projected column is Product Department. The detail filter specifies that the Product Family should be "Food." In one embodiment, the application 150 may perform a sequence of operations to generate an OLAP expression for the detail filter. For example, the application 150 may translate the detail filter into an OLAP canonical form. For instance, if the report specification includes <level> in (<member_expression>[, <member_expression>]*), the application 150 may generate a canonical OLAP expression of INTERSECT (<level> MEMBERS, {<member_expression>[, <member_expression>]*}. As is known, INTERSECT ( ) is an MDX function that returns the intersection of two input sets, optionally retaining duplicates. In this case, the application 150 may generate a canonical OLAP expression of INTERSECT (Product Family.MEMBERS, {Food }).

Because members from the same hierarchy are involved, the application may correlate the projected expression to a level of the projected members to perform filtering. For example, the application 150 may generate an OLAP expression of INTERSECT (Product Department.MEMBERS, DESCENDANTS (INTERSECT (Product Family.MEMBERS, {Food}), Product Department), ALL). The application 150 may filter the projected member by filtering members prior to any set operation or dimensional operation. For example, the application 150 may generate an OLAP expression of INTERSECT (Product Department.MEMBERS, DESCENDANTS(INTERSECT(Product Family.MEMBERS, {Food}), Product Department), ALL).

In one embodiment, the application 150 may generate an OLAP expression related to the product department on the edge of the cube. For example, the OLAP expression may be TOPCOUNT (INTERSECT (Product Department.MEMBERS, DESCENDANTS (INTERSECT (Product Family.MEMBERS, {Food}), Product Department), ALL), 3, Unit Sales). The application 150 may optimize this OLAP expression and include the optimized OLAP expression in the OLAP query (e.g., DESCENDANTS([Product].[All Products].[Food], [Product]. [Product Department]) of Table V). Consequently, the OLAP query of Table V produces results consistent with the relational query of Table III.

Figure 8:
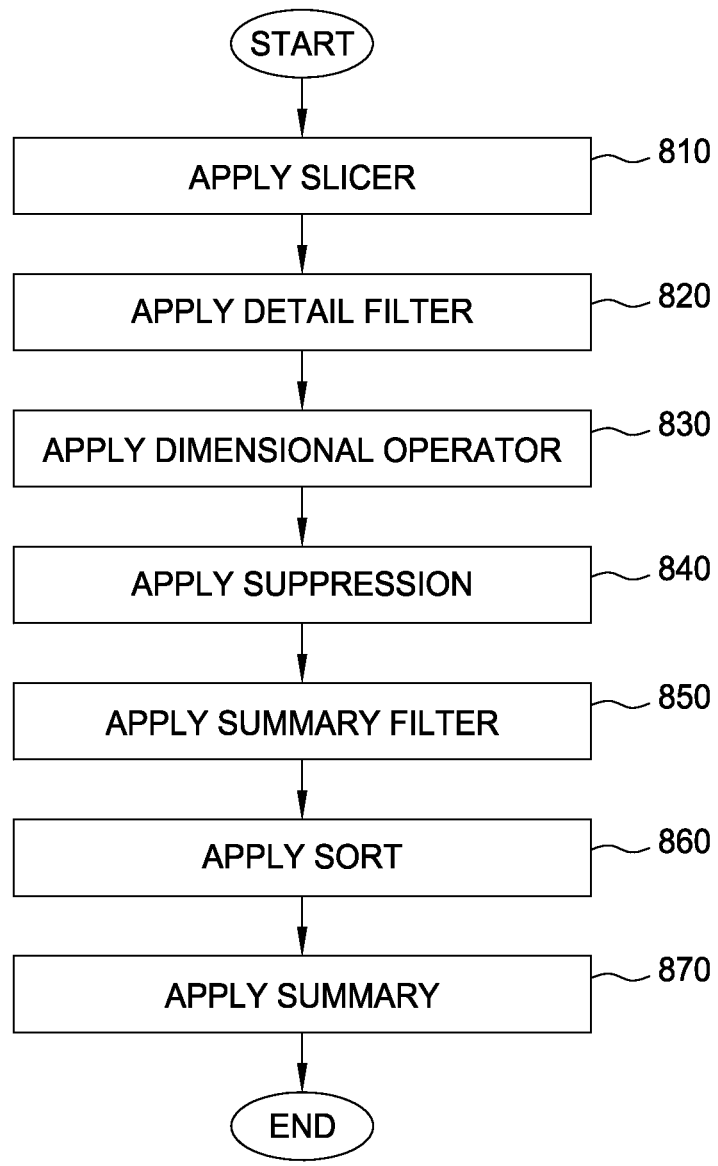
FIG. 8 is a flowchart depicting a method for generating the OLAP query, according to one embodiment of the invention.

FIG. 8 is a flowchart depicting a method 800 for generating the OLAP query 154 of FIG. 1, according to one embodiment of the invention. As shown, the method 600 begins at step 810, where the application 150 applies any slicer in the OLAP query. At step 820, the application 150 applies any detail filter in the OLAP query. At step 830, the application 150 applies any dimensional operator in the OLAP query. At step 840, the application 150 applies any suppression in the OLAP query. At step 850, the application 150 applies any summary filter in the OLAP query. At step 860, the application 150 applies any sort in the OLAP query. At step 870, the application applies any summary in the OLAP query. After the step 870, the method 800 terminates.

In one embodiment, the application 150 converts different reporting constructs (e.g., detail filters, suppression, etc.) of a report specification into an OLAP query such that the order in which the constructs are applied (in executing the OLAP query) is consistent with an SQL query corresponding to the report specification (i.e., that satisfies the report semantics). In other words, the application 150 conveys different reporting constructs in an OLAP query such that a predetermined precedence of the reporting constructs is maintained when the OLAP query is executed.

The following are examples of how the different reporting constructs are converted into an OLAP query. The examples are presented in conjunction with a virtual data warehouse and report specifications that are authored against data in the virtual data warehouse. The report specifications may include various reporting constructs such as sorting and detail filters. In one embodiment, these reporting constructs are common to a variety of applications for reporting and/or analyzing data.

In one embodiment, the application 150 determines a precedence of the reporting constructs for producing semantically accurate results. The application 150 may determine an order to apply reporting constructs (from a report specification) in an OLAP query, based on the determined precedence. In one embodiment, the determined precedence includes the following reporting constructs: report slicer, detail filter, dimensional operators, summary filter, suppression, summary computation, and sorting. These reporting constructs are also referred to herein as virtual warehouse operations.

The virtual warehouse operations combine concepts from both relational reporting (e.g., detail filter, summary filter, summary computation, and sorting) and multi-dimensional analysis (e.g., slicer, dimensional operators, suppression). In one embodiment, the application 150 may convey a report specification that includes the virtual warehouse operations into a single OLAP query that produces results consistent with a SQL query corresponding to the report specification. That is, the results from executing the single OLAP query need not diverge slightly (or at all) from results from the SQL query. Further, the application 150 need not require multiple OLAP queries or post-processing of data.

As described above, in one embodiment, the application 150 applies the reporting constructs in a single OLAP query to produce results that are semantically consistent with the SQL query. The reporting constructs are further described in the following examples. The following examples are authored against an OLAP data source. The OLAP data source is the FoodMart Sales database which ships as part of SQL Server™ Analysis Services 2000 from Microsoft® Corp. of Redmond, Wash.

FIG. 9 illustrates a relevant portion 900 of the dimensional model of the OLAP data source, according to one embodiment of the invention. As shown, the relevant portion 900 includes dimensions 906 and a measure 912. The dimensions include a Products dimension and a Time dimension. Each dimension 906 includes one or more hierarchies 908. The Products dimension includes a Product hierarchy. The Time dimension includes a Time hierarchy. Each hierarchy 908 includes one or more levels 910. The Product hierarchy includes the following levels: Product Family, Product Department, Product Category, Product Subcategory, Brand Name, and Product Name. The Time hierarchy includes the following levels: Year, Quarter, and Month. The measure 912 includes Unit Sales.

FIGS. 10A-10D relate to conveying a SQL ORDER BY clause in an OLAP query, according to one embodiment of the invention. In this example, suppose a user authors a report specification that projects three columns: Product Family, Product Department, and Unit Sales. The Unit Sales values are grouped/summarized by the other two columns and the report is sorted by the Product Family and Product Department column values. FIG. 10A illustrates a layout 1002 of the report, according to one embodiment of the invention. As shown, the layout 1002 includes a Product Family column 1004, a Product Department column 1006, and a Unit Sales column 1008. FIG. 10B illustrates the corresponding report 1010, according to one embodiment of the invention. As shown, the report 1010 includes a Product Family column 1012, a Product Department column 1014, and a Unit Sales column 1016.

FIG. 10C illustrates a corresponding SQL query 1020 posed against an equivalent relational database, according to one embodiment of the invention. Because Product Family and Product Department in the dimensional model are from the same dimension, their values (members) are returned in a single set of values, as opposed to separate columns (or sets) of values. Thus, as shown by an ORDER BY clause 1022 of the SQL query 1020, the SQL query 1020 retrieves the Product Family members in order and, for each member/value, by the collection of Product Department members/values that are descendants of the respective Product Family member.

FIG. 10D illustrates a corresponding MDX query 1030 generated by the application 150, according to one embodiment of the invention. As shown, the application 150 may convey an equivalent of the SQL ORDER BY clause by applying the MDX ORDER function to the sets of Product Family members and Product Department members, as shown by the MDX ORDER clauses 1032.

FIGS. 11A-11D relate to conveying null suppression in an OLAP query, according to one embodiment of the invention. In this example, suppose a user authors a report specification that projects three columns: Product Family, Year, and Unit Sales, grouping Unit Sales values by the other two column values. Any grouped values of null are eliminated from the report. FIG. 11A illustrates a layout 1102 of the report, according to one embodiment of the invention. As shown, the layout 1102 includes a Product Family column 1104, a Year column 1106, and a Unit Sales column 1108. FIG. 11B illustrates the corresponding report 1110, according to one embodiment of the invention. As shown, the report 1110 includes a Product Family column 1112, a Year column 1114, and a Unit Sales column 1116.

FIG. 11C illustrates a corresponding SQL query posed against an equivalent relational database, according to one embodiment of the invention. As shown by a WHERE clause 1122 of the SQL query 1120, the SQL query 1120 suppresses rows having a null value for Unit Sales.

FIG. 11D illustrates a corresponding MDX query 1130 generated by the application 150, according to one embodiment of the invention. As shown, the application 150 may convey null suppression using an MDX NON EMPTY clause 1132, which applies suppression after all other operations have been performed on the data.

Figure 12D:
Figure 12D:

FIGS. 12A-12D also relate to conveying null suppression in an OLAP query, according to one embodiment of the invention. In this example, suppose a user authors a report specification that projects three columns: Product Family, Year, and Unit Sales, grouping Unit Sales values by the other two column values. Any grouped values of null are eliminated from the report. Further, suppose that the report includes an overall report summary of the total Unit Sales values in the report. FIG. 12A illustrates a layout 1202 of the report, according to one embodiment of the invention. As shown, the layout 1202 includes a Product Family column 1204, a Year column 1206, a Unit Sales column 1208, and a summary 1209. FIG. 12B illustrates the corresponding report 1210, according to one embodiment of the invention. As shown, the report 1210 includes a Product Family column 1212, a Year column 1214, a Unit Sales column 1216, and a summary 1211.

FIG. 12C illustrates a corresponding SQL query 1220 posed against an equivalent relational database, according to one embodiment of the invention. As shown by WHERE clauses 1222 of the SQL query 1220, the SQL query 1220 suppresses rows having a null value for Unit Sales.

FIG. 12D illustrates a corresponding MDX query 1230 generated by the application 150, according to one embodiment of the invention. The MDX query 1230 may compute the summary for all non-null values. In one embodiment, the application may convey a summary in the MDX query 1230 using MDX calculated members. As shown, the application 150 generates MDX query fragments 1232 that include a call to the MDX FILTER function. The MDX FILTER function is used to remove all combinations of Product Family and Year that result in a null value prior to the computing the summary. The report should include the summary, even if the summary value is null. Consequently, the application may not use the MDX NON EMPTY function to remove rows with null 'Unit Sales' values, because doing so may remove the summary row of data. Thus, the MDX query fragments 1232 include a call to the MDX FILTER function. The MDX FILTER function is used (in a similar fashion as for the calculated member) to remove rows of data with null Unit Sales values.

FIGS. 13A-13D relate to conveying a post-aggregation filter in an OLAP query, according to one embodiment of the invention. In this example, suppose a user authors a report specification that projects columns Product Family, Product Department, and Unit Sales. Further, suppose that the report specification groups Unit Sales values with the two other column values and applies a post-aggregation filter of Unit Sales>10,000. That is, any grouped values that do not satisfy the filter condition are removed from the report results. FIG. 13A illustrates a layout 1302 of the report, according to one embodiment of the invention. As shown, the layout 1302 includes a Product Family column 1304, a Product Department column 1306, and a Unit Sales column 1308. FIG. 13B illustrates the corresponding report 1310, according to one embodiment of the invention. As shown, the report 1310 includes a Product Family column 1312, a Product Department column 1314, and a Unit Sales column 1316.

FIG. 13C illustrates a corresponding SQL query 1320 posed against an equivalent relational database, according to one embodiment of the invention. As shown by a HAVING clause 1322 of the SQL query 1320, the SQL query 1320 suppresses grouped values that do not satisfy the filter condition of Unit Sales>10,000.

FIG. 13D illustrates a corresponding MDX query 1330 generated by the application 150, according to one embodiment of the invention. The MDX query 1330 generates a single collection of Product dimension members such that each Product Family member is followed by related Product Department members. Further, the MDX query 1330 applies two filters. As shown in a call 1332 to the MDX FILTER FUNCTION, the MDX query 1330 applies a first filter to the 'Product Department' members to satisfy the Unit Sales filter. As shown in calls 1334 to the MDX HEAD function, the MDX query 1330 applies a second filter to remove any Product Family members for which no Product Department members satisfy the filter.

FIGS. 14A-14C relate to applying OLAP set operations in an OLAP query, according to one embodiment of the invention. The application 150 may apply OLAP set operations directly to sets of members (values), because the OLAP semantics are directly represented in MDX. In this example, suppose a user authors a report specification that projects columns Product Family, Product Department and Unit Sales are projected. Further, suppose that the report specification groups the Unit Sales values by values of the other two columns. Further still, suppose that the report specification applies an OLAP filter (set operation) of "Top 3" to the Product Department column. FIG. 14A illustrates a layout 1402 of the report, according to one embodiment of the invention. As shown, the layout 1402 includes a Product Family column 1404, a Top 3 Product Department column 1406, and a Unit Sales column 1408. FIG. 14B illustrates the corresponding report 1410, according to one embodiment of the invention. As shown, the report 1410 includes a Product Family column 1412, a Top 3 Product Department column 1414, and a Unit Sales column 1416. Further, the OLAP set operations are not modeled upon a relational construct and, as such, do not have a corresponding SQL query.

FIG. 14C illustrates a corresponding MDX query 1420 generated by the application 150, according to one embodiment of the invention. As shown in a query fragment 1422 of the MDX query 1420, the MDX query 1420 applies the MDX TOPCOUNT function to the descendants of each of the Product Family members. Because, Product Family and Product Department are from the same hierarchy, the MDX query 1420 produces a set containing Product Family members followed by corresponding "Top 3" Product Department members.

FIGS. 15A-15D relate to conveying a report summary in an OLAP query, according to one embodiment of the invention. In this example, suppose a user authors a report specification that projects columns Product Family, Year and Unit Sales. Further, the report specification groups Unit Sales values by values of the other two columns. Further still, the report specification includes an overall summary of total Unit Sales values from the report. FIG. 15A illustrates a layout 1502 of the report, according to one embodiment of the invention. As shown, the layout 1502 includes a Product Family column 1504, a Year column 1506, a Unit Sales column 1508, and a summary 1510. FIG. 15B illustrates the corresponding report 1512, according to one embodiment of the invention. As shown, the report 1512 includes a Product Family column 1514, a Year column 1516, a Unit Sales column 1518, and a report summary 1520.

FIG. 15C illustrates a corresponding SQL query posed against an equivalent relational database, according to one embodiment of the invention. As shown by a query fragment 1524 of the SQL query 1522, the SQL query 1522 computes the report summary in a separate SELECT statement that is UNIONed to the body of the report having the grouped Unit Sales values.

FIG. 15D illustrates a corresponding MDX query 1530 generated by the application 150, according to one embodiment of the invention. As shown in a query fragment 1532 of the MDX query 1530, the MDX query 1530 aggregates the sum of Unit Sales across all of the detail rows in the report to ensure the summary value in the report corresponds accurately to the visible details. Further, the MDX query 1530 appends the report summary to the collection of detail rows (members/values).

FIGS. 16A-16D relate to conveying a report slicer in an OLAP query, according to one embodiment of the invention. The report slicer is similar to an MDX slicer, but unlike the MDX slicer, a dimension may appear on both an edge and the slicer. When this occurs, the slicer acts as a filter of the cell values corresponding to members of the same dimension that appear on the edges of the query. Thus, neither MDX nor SQL supports the report slicer directly.

In this example, suppose a user authors a report specification that projects columns Product Family, Year, and Unit Sales. Further, the report specification groups Unit Sales values by the other two columns. Further still, the report specification includes a slicer containing the Beverages member from the Product Department level of the Product dimension. FIG. 16A illustrates a layout 1602 of the report, according to one embodiment of the invention. As shown, the layout 1602 includes a Product Family column 1604, a Year column 1606, and a Unit Sales column 1608. FIG. 16B illustrates the corresponding report 1610, according to one embodiment of the invention. As shown, the report 1610 includes a Product Family column 1612, a Year column 1614, and a Unit Sales column 1616. In the report 1610, the value associated with Drink reflects only the value of Beverages. Further, because Beverages is not a descendant of Food or of Non-Consumable, the values associated with those members are null.

FIG. 16C illustrates a corresponding SQL query posed against an equivalent relational database, according to one embodiment of the invention. As shown, the SQL query 1620 includes a query fragment 1622. The query fragment 1622 includes two SELECT statements. The first SELECT statement produces the sum of Unit Sales for Beverages. The second SELECT statement produces "null" Unit Sales values for Product Family members that are not related to Beverages.

FIG. 16D illustrates a corresponding MDX query 1630 generated by the application 150, according to one embodiment of the invention. As shown in a query fragment 1630 of the MDX query 1630, the MDX query 1630 uses an MDX slicer rather than projecting a calculated member in a dimension. The calculated member constructs the set of members that intersects with Beverages and computes the sum of corresponding Unit Sales values. Further, unlike the SQL query, which UNIONs sets together, the MDX query 1630 only constructs a single set.

FIGS. 17A-17E relate to conveying a summary filter in an OLAP query, according to one embodiment of the invention. In this example, suppose a user authors a report specification that projects columns Product Family, Product Department, and Unit Sales. Further, the report specification groups the Unit Sales values are grouped by values of the other two columns. Further still, the report specification includes a summary row (for each distinct Product Family) that is the sum of all Unit Sales values for the respective Product Family. Still further, the report specification applies a summary filter. The summary filter removes rows associated with Product Family members for which the total of Unit Sales is less than 25,000.

In this example, producing the report involves computing a summary value for each Product Family and removing detail and summary rows for all Product Family members that do not satisfy the filter criteria. In effect, producing the report involves evaluating the query in at least two passes (i.e., a summary followed by a filter). FIG. 17A illustrates a layout 1702 of the report, according to one embodiment of the invention. As shown, the layout 1702 includes a Product Family column 1704, a Product Department column 1706, a Unit Sales column 1708, and a summary 1710.

FIG. 17B illustrates the corresponding report 1712 prior to applying the summary filter, according to one embodiment of the invention. As shown, the report 1712 includes a Product Family column 1714, a Product Department column 1716, a Unit Sales column 1718, and summaries 1720. Further, the summaries 1720 include Unit Sales of 24,597 for Drink, Unit Sales of 191,940 for Food, and Unit Sales of 50,236 for Non-Consumable. FIG. 17C illustrates the corresponding report 1726 subsequent to applying the summary filter, according to one embodiment of the invention. As shown, the report 1726 includes a Product Family column 1728, a Product Department column 1730, a Unit Sales column 1732, and a summary 1734. Further, the summary 1726 includes only Unit Sales of 24,597 for Drink.

FIG. 17D illustrates a corresponding SQL query 1740 posed against an equivalent relational database, according to one embodiment of the invention. The SQL query 1740 includes a query fragment 1742. The query fragment 1742 includes a nested SELECT and an outer SELECT. The nested SELECT (i.e., "FilteredSales") produces the filtered set of Product Family values. The outer SELECT (i.e., the second pass) produces corresponding detail values. The SQL query 1740 may include an additional SELECT statement (that is similar to the SQL query, but groups by Product Family) to produce a Product Family summary value. The additional SELECT statement may be UNIONed with the SQL query 1740.

FIG. 17E illustrates a corresponding MDX query 1750 generated by the application 150, according to one embodiment of the invention. As shown in a query fragment 1752 of the MDX query 1750, the MDX query 1750 uses the MDX FILTER expression to filter Product Family members by a sum of Unit Sales values of descendant Product Department members. The resulting set of members may then be used to construct a set containing Product Family, each of which is followed by descendant Product Department members and corresponding Unit Sales values, followed by a sum of the corresponding Unit Sales values.

FIGS. 18A-18F relate to conveying multiple reporting constructs in an OLAP query, according to one embodiment of the invention. This example shows how the application 150 conveys the reporting constructs of the previous examples from a report specification into a single MDX query that produces results that are semantically consistent with a corresponding SQL query.

In this example, suppose a user authors a report specification that projects columns Product Family, Product Department, and Unit Sales. Further, the report specification includes a slicer operation on Drink and Food (Product Family values). Further, the report specification includes a detail filter of Gender=F. Further, the report specification includes a summary filter of Unit Sales<15,000, applied at a grouping of Product Family. Further, the report specification includes suppression (removes nulls). Further, the report specification includes a summary of Unit Sales for Product Family. Further, the report specification orders results by Product Family in ascending order.

FIG. 18A illustrates a layout 1802 of the report, according to one embodiment of the invention. As shown, the layout 1802 includes a Product Family column 1804, a Product Department column 1806, and a Unit Sales column 1808. FIG. 18B illustrates the corresponding report 1812, according to one embodiment of the invention. As shown, the report 1812 includes a Product Family column 1814, a Product Department column 1816, and a Unit Sales column 1818. As shown, the report 1812 includes the Product Family of Drink. The report 1812 includes the Product Departments of Alcoholic Beverages, Beverages, and Dairy. The Unit Sales for Alcoholic Beverages is 3,439. The Unit Sales for Beverages is 6,776. The Unit Sales for Dairy is 1,987. The Unit Sales Summary is 12,202.

FIG. 18C-18D illustrate a corresponding SQL query 1830 posed against an equivalent relational database, according to one embodiment of the invention. As shown, the SQL query 1830 includes a query fragment 1620. Note that the slicer is applied in the SQL query 1830 by applying filter expressions 1834 in multiple places within the query—specifically, at the lowest nesting of the SELECT statements to ensure it is applied first to the query. The filter expressions 1834 include "WHERE Product Family in (Drink, Food)" and "WHERE Product Family not in (Drink, Food)." Further, the SQL query applies the detail filter using an expression 1836 "WHERE Gender=F." Note that the detail filter is applied to SELECT statements that have already applied the slicer condition, thus ensuring the correct order of application. Further, the SQL query 1830 applies the summary filter using a query fragment 1840. The query fragment 1840 includes a SQL HAVING clause and a corresponding SQL GROUP BY clause. The GROUP BY clause groups the Unit Sales values by a scope of the Product Family filter. Further, the SQL query 1830 applies suppression using a WHERE filter expression 1838 "Unit Sales is not null." The SQL query 1830 computes summary values using the SQL GROUP BY clause 1842. The SQL query 1830 orders results by applying the ORDER BY clause 1844 to the results of the nested SELECT statements.

Figure 18F:

FIGS. 18E-18F illustrate a corresponding MDX query 1860 generated by the application 150, according to one embodiment of the invention. As shown, the MDX query 1860 applies the slicer using the calculated members XQE_MDF_CM1 and XQE_SL_CM0, in a query fragment 1870 of the MDX query 1860. The query fragment 1870 corresponds to the filter expressions 1834 of FIGS. 18C-18D. Further, the MDX query 1860 applies the detail filter in XQE_MDF_CM1, in a query fragment 1868 of the MDX query 1860. This is because a post-aggregation filer in MDX is semantically equivalent to the slicer. The query fragment 1868 corresponds to the expression 1836 of FIGS. 18C-18D.

Further, the MDX query 1860 applies the summary filter using the MDX FILTER function with a filter expression 1862 "[Measures].[Unit Sales]<15000." The MDX query 1860 applies the filter twice: a first time to filter the detail rows of the report and a second time in computing the summary value. The filter expression 1862 corresponds to the query fragment 1840 of FIGS. 18C-18D.

Further, as shown in a query fragment 1864 of the MDX query 1860, the MDX query 1860 suppresses rows with null data from the report by applying an MDX FILTER function that filters out all Unit Sales values that are empty. The query fragment 1864 corresponds to the filter expression 1838 of FIGS. 18C-18D.

Further, as shown in a query fragment 1866 of the MDX query 1860, the MDX query 1860 computes summaries using a calculated member XQE_RS_CM2 which is UNIONed with the detail rows. The query fragment 1866 corresponds to the clause 1842 of FIGS. 18C-18D.

Further, as shown in a query fragment 1872 of the MDX query 1860, the MDX query 1860 sorts the values in the report by applying the MDX ORDER function. The query fragment 1872 corresponds to the clause 1844 of FIGS. 18C-18D.

In one embodiment, the application 150 performs the following steps to convey reporting constructs in an OLAP query such that the reporting constructs are applied in a specific order. For list reports, the application 150 uses a single-edged cross tab to obtain results. For cross tab reports, the application 150 applies the reporting constructs to produce the same results as if a list report was pivoted to a cross tab. Further, the application 150 implements a report slicer using an OLAP slicer (e.g., MDX slicer). The application 150 uses a calculated member to compute cell values relative to each of the tuples containing members from the different dimensions projected on the edge of the query.

Further, the application 150 may convey post-aggregation detail filters in the same manner as report slicers. Alternatively, the application 150 may implement post-aggregation detail filters as OLAP set expressions (e.g., MDX FILTER function) to filter sets the edge of the OLAP query. Further, the application 150 may apply dimensional operators to the sets that are produced by the previous steps. Further, the application 150 may apply summary filters to the produced set in the previous step, using OLAP aggregation functions to compute the values used for filtering the produced set. Pre-aggregate values that are semantically equivalent to a summary filter may also be used for filtering the produced set.

Further, the application 150 may convey suppression using a NON EMPTY clause (e.g., MDX NON EMPTY) in simple cases. Alternatively, the application 150 may convey suppression by using an OLAP filter function (e.g., MDX FILTER) to remove null values from the set produced from the previous step.

Further, the application 150 may convey summary computations using calculated members that re-apply filters and suppression from previous steps to re-create tuples of the edges and to aggregate values. Further, the application 150 may convey a sorting operation by applying an OLAP ORDER function (e.g., MDX ORDER) function to sets that are UNIONed to produce the edge of tuples/values for the query.

In one embodiment, the application 150 may convey reporting constructs in an OLAP query in various ways, as long as the reporting constructs are conveyed in a manner that conforms an order of operation that is determined based on precedence of operators. The application 150 may define the precedence of operators for queries against a virtual warehouse.

Of course, the embodiments described herein are intended to be illustrative and not limiting of the invention, and other embodiments are broadly contemplated. Further, those skilled in the art will recognize that embodiments of the invention may be adapted to support other OLAP queries, other relational database queries, data models for data warehousing other than cubes, and underlying data stored in databases other than relational databases. Further, various OLAP systems may be supported, e.g., multidimensional OLAP (MOLAP), hybrid OLAP (HOLAP), and data warehousing and OLAP (DOLAP).

Advantageously, embodiments of the invention provide techniques for generating an OLAP query from a report specification for an OLAP system. The report specification may include relational constructs. In one embodiment, an application applies the relational constructs in a specific order in the OLAP query to preserve semantics of the report specification. The application may convert the relational constructs based on a mapping. Consequently, results from executing the OLAP query may be consistent with applying the relational constructs to a relational database corresponding to the OLAP system. In other words, the application processes relational constructs in a data-agnostic way (i.e., independent of the way in which the data is stored). Consequently, a user may include relational constructs in a report specification for any system (including an OLAP system).

While the foregoing is directed to embodiments of the present invention, other and further embodiments of the invention may be devised without departing from the basic scope thereof, and the scope thereof is determined by the claims that follow.

What is claimed is:

1. A computer-implemented method to interleave dimensional and relational query constructs in a single, dimensional query, based on a report specification and a predetermined sequence and without introducing semantic inconsistencies, the computer-implemented method comprising:
   receiving user indication of a plurality of query constructs to include in a the report specification to retrieve a set of query results from a dimensional data model, wherein the report specification is expressed in a predefined reporting language of a higher level of abstraction than both a relational query language and a dimensional query language, wherein the dimensional data model includes a cube having a plurality of dimensions, at least one dimension including a hierarchy of members, wherein the plurality of query constructs includes the dimensional and relational query constructs;
   generating the single, dimensional query from the report specification by operation of the one or more computer processors and based on the predetermined sequence of applying the plurality of query constructs in the single, dimensional query and based further on a plurality of mapping rules specifying how to map between the dimensional data model and a corresponding relational data model, in order to prevent one or more semantic inconsistencies in the set of query results when interleaving the dimensional and relational query constructs in the single, dimensional query;
   wherein the predetermined sequence specifies to arrange the plurality of query constructs in an order of application of: a dimensional slicer, a dimensional pre-aggregation detail filter, a relational post-aggregation detail filter, a dimensional set filtering operator, a dimensional suppression, a relational summary filter, a relational sort, and a relational summary operator;
   wherein the plurality of mapping rules includes a model mapping rule, a level mapping rule, a leaf mapping rule, a cell mapping rule, a ragged mapping rule, a fact mapping rule, and a child mapping rule;
   wherein the single, dimensional query is executed in order to generate the set of query results; and
   outputting the set of query results responsive to the report specification.

2. The computer-implemented method of claim 1, wherein the dimensional data model further includes a fact table, wherein each dimension has one or more properties, wherein the hierarchy of the at least one dimension includes a plurality of levels, wherein the single, dimensional query is generated from the report specification further based on a predetermined mapping between the dimensional data model and a corresponding relational data model, wherein plurality of mapping rules includes:
   the model mapping rule, which specifies that the dimensional data model maps to a relational data warehouse snowflake model;
   the level mapping rule, which specifies that each level maps to a relational column;
   the property mapping rule, which specifies that each property maps to a relational column;
   the leaf mapping rule, which specifies to enforce referential integrity by verifying that each leaf member of the hierarchy has at least one corresponding record in the fact table;
   the cell mapping rule, which specifies to enforce referential integrity by verifying that each cell in the fact table has a single entry in a corresponding dimension;
   the ragged mapping rule, which specifies that any ragged and unbalanced hierarchy maps to a column having a null value;
   the fact mapping rule, which specifies that to verify that the fact table contains a column for each measure; and
   the child mapping rule, which specifies to map any parent-child hierarchy to a corresponding level-based hierarchy based on distances from each parent-child-hierarchy member to a parent-child-hierarchy root member.

3. The computer-implemented method of claim 1, wherein the model mapping rule specifies that the dimensional data model maps to a relational data warehouse snowflake model.

4. The computer-implemented method of claim 1, wherein the level mapping rule specifies that each hierarchy level maps to a relational column.

5. The computer-implemented method of claim 1, wherein the property mapping rule specifies that each dimension property maps to a relational column.

6. The computer-implemented method of claim 1, wherein the leaf mapping rule specifies to enforce referential integrity by verifying that each hierarchy leaf member has at least one corresponding record in a fact table.

7. The computer-implemented method of claim 1, wherein the cell mapping rule specifies to enforce referential integrity by verifying that each fact table cell has a single entry in a corresponding dimension.

8. The computer-implemented method of claim 1, wherein the ragged mapping rule specifies that any ragged and unbalanced hierarchy maps to a column having a null value.

9. The computer-implemented method of claim 1, wherein the fact mapping rule specifies to verify that each fact table contains a column for each measure.

10. The computer-implemented method of claim 1, wherein the child mapping rule specifies to map any parent-child hierarchy to a corresponding level-based hierarchy based on distances from each parent-child-hierarchy member to a parent-child-hierarchy root member.

11. A computer-readable storage medium containing a program which, when executed, performs an operation to interleave dimensional and relational query constructs in a single, dimensional query, based on a report specification and a predetermined sequence and without introducing semantic inconsistencies, the operation comprising:

receiving user indication of a plurality of query constructs to include in the report specification to retrieve a set of query results from a dimensional data model, wherein the report specification is expressed in a predefined reporting language of a higher level of abstraction than both a relational query language and a dimensional query language, wherein the dimensional data model includes a cube having a plurality of dimensions, at least one dimension including a hierarchy of members, wherein the plurality of query constructs includes the dimensional and relational query constructs;

generating the single, dimensional query from the report specification by operation of the one or more computer processors when executing the program and based on the predetermined sequence of applying the plurality of query constructs in the single, dimensional query and based further on a plurality of mapping rules specifying how to map between the dimensional data model and a corresponding relational data model, in order to prevent one or more semantic inconsistencies in the set of query results when interleaving the dimensional and relational query constructs in the single, dimensional query;

wherein the predetermined sequence specifies to arrange the plurality of query constructs in an order of application of: a dimensional slicer, a dimensional pre-aggregation detail filter, a relational post-aggregation detail filter, a dimensional set filtering operator, a dimensional suppression, a relational summary filter, a relational sort, and a relational summary operator;

wherein the plurality of mapping rules includes a model mapping rule, a level mapping rule, a leaf mapping rule, a cell mapping rule, a ragged mapping rule, a fact mapping rule, and a child mapping rule;

wherein the single, dimensional query is executed in order to generate the set of query results; and outputting the set of query results responsive to the report specification.

12. The computer-readable storage medium of claim 11, wherein the model mapping rule specifies that the dimensional data model maps to a relational data warehouse snowflake model.

13. The computer-readable storage medium of claim 11, wherein the level mapping rule specifies that each hierarchy level maps to a relational column.

14. The computer-readable storage medium of claim 11, wherein the property mapping rule specifies that each dimension property maps to a relational column.

15. The computer-readable storage medium of claim 11, wherein the leaf mapping rule specifies to enforce referential integrity by verifying that each hierarchy leaf member has at least one corresponding record in a fact table.

16. The computer-readable storage medium of claim 11, wherein the cell mapping rule specifies to enforce referential integrity by verifying that each fact table cell has a single entry in a corresponding dimension.

17. The computer-readable storage medium of claim 11, wherein the ragged mapping rule specifies that any ragged and unbalanced hierarchy maps to a column having a null value.

18. A system to interleave dimensional and relational query constructs in a single dimensional query, based on a report specification and a predetermined sequence and without introducing semantic inconsistencies, the system comprising:

one or more computer processors; and a memory containing a program, which when executed by the one or more computer processors is configured to perform an operation comprising:

receiving user indication of a plurality of query constructs to include in the report specification to retrieve a set of query results from a dimensional data model, wherein the report specification is expressed in a predefined reporting language of a higher level of abstraction than both a relational query language and a dimensional query language, wherein the dimensional data model includes a cube having a plurality of dimensions, at least one dimension including a hierarchy of members, wherein the plurality of query constructs includes the dimensional and relational query constructs;

generating the single, dimensional query from the report specification based on the predetermined sequence of applying the plurality of query constructs in the single, dimensional query and based further on a plurality of mapping rules specifying how to map between the dimensional data model and a corresponding relational data model, in order to prevent one or more semantic inconsistencies in the set of query results when interleaving the dimensional and relational query constructs in the single, dimensional query;

wherein the predetermined sequence specifies to arrange the plurality of query constructs in an order of application of: a dimensional slicer, a dimensional pre-aggregation detail filter, a relational post-aggregation detail filter, a dimensional set filtering operator, a dimensional suppression, a relational summary filter, a relational sort, and a relational summary operator;

wherein the plurality of mapping rules includes a model mapping rule, a level mapping rule, a leaf mapping rule, a cell mapping rule, a ragged mapping rule, a fact mapping rule, and a child mapping rule;

wherein the single, dimensional query is executed in order to generate the set of query results; and outputting the set of query results responsive to the report specification.

19. The system of claim 18, wherein the model mapping rule specifies that the dimensional data model maps to a relational data warehouse snowflake model.

20. The system of claim 18, wherein the level mapping rule specifies that each hierarchy level maps to a relational column.

21. The system of claim 18, wherein the property mapping rule specifies that each dimension property maps to a relational column.

22. The system of claim 18, wherein the leaf mapping rule specifies to enforce referential integrity by verifying that each hierarchy leaf member has at least one corresponding record in a fact table.

23. The system of claim 18, wherein the cell mapping rule specifies to enforce referential integrity by verifying that each fact table cell has a single entry in a corresponding dimension.

24. The system of claim 18, wherein the ragged mapping rule specifies that any ragged and unbalanced hierarchy maps to a column having a null value.

* * * * *